United States Patent
Ide et al.

(10) Patent No.: US 11,281,007 B2
(45) Date of Patent: Mar. 22, 2022

(54) DISPLAY DEVICE HAVING LIGHT-TRANSMITTING MEMBER ON OPTICAL UNIT

(71) Applicant: SEIKO EPSON CORPORATION, Tokyo (JP)

(72) Inventors: Mitsutaka Ide, Shiojiri (JP); Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 29 days.

(21) Appl. No.: 16/827,755

(22) Filed: Mar. 24, 2020

(65) Prior Publication Data
US 2020/0310129 A1    Oct. 1, 2020

(30) Foreign Application Priority Data

Mar. 25, 2019 (JP) .............................. JP2019-056508

(51) Int. Cl.
*G02B 27/01* (2006.01)
*G03H 1/02* (2006.01)
*G02B 5/18* (2006.01)

(52) U.S. Cl.
CPC ....... *G02B 27/0172* (2013.01); *G02B 5/1861* (2013.01); *G03H 1/0248* (2013.01); *G02B 2027/0174* (2013.01); *G02B 2027/0178* (2013.01)

(58) Field of Classification Search
None
See application file for complete search history.

(56) References Cited

U.S. PATENT DOCUMENTS

| 4,927,234 A * | 5/1990 | Banbury ............ G02B 27/0101 345/9 |
| 5,604,611 A | 2/1997 | Saburi et al. |
| 6,788,442 B1 * | 9/2004 | Potin .................. G02B 27/0172 345/8 |
| 2013/0222384 A1 * | 8/2013 | Futterer ................... G03H 1/26 345/426 |
| 2017/0261751 A1 | 9/2017 | Noguchi et al. |
| 2019/0235266 A1 | 8/2019 | Ide et al. |

FOREIGN PATENT DOCUMENTS

| JP | H05-203812 A | 8/1993 |
| JP | 2000-310936 A | 11/2000 |
| JP | 3321849 B2 | 9/2002 |
| JP | 2017-167181 A | 9/2017 |
| JP | 2019-133132 A | 8/2019 |

* cited by examiner

*Primary Examiner* — Jennifer D. Carruth
(74) *Attorney, Agent, or Firm* — Oliff PLC

(57) ABSTRACT

A display device according to the present invention includes, along an optical path of image light emitted from an image light generating device, a first optical unit having positive power, a second optical unit having positive power and including a first diffraction element of a reflective type, a third optical unit having positive power, and a fourth optical unit having positive power and including a second diffraction element of a reflective type. The second optical unit includes a first light-transmitting member having optical power and provided at a first surface of the first diffraction element, and a light shielding member provided at a second surface of the first diffraction element.

9 Claims, 14 Drawing Sheets

DISPLAY DEVICE HAVING LIGHT-TRANSMITTING MEMBER ON OPTICAL UNIT

The present application is based on, and claims priority from JP Application Serial Number 2019-056508, filed Mar. 25, 2019, the disclosure of which is hereby incorporated by reference herein in its entirety.

BACKGROUND

1. Technical Field

The present disclosure relates to a display device.

2. Related Art

As a display device including a diffraction element such as a holographic element, a display device has been proposed in which image light emitted from an image light generating device is deflected toward an eye of an observer by a diffraction element. Interference patterns are optimized in the diffraction element to obtain an optimum diffraction angle and optimum diffraction efficiency at a specific wavelength. However, the image light has a predetermined spectral width centered at a specific wavelength, and thus, light with a peripheral wavelength deviated from the specific wavelength may cause a decrease in resolution of an image. Thus, a display device has been proposed in which image light emitted from the image light generating device is directed by a first diffraction element of the reflective type toward a second diffraction element disposed in front of the first diffraction element and in which the second diffraction element deflects, toward the eye of the observer, the image light emitted from the first diffraction element. With this configuration, the first diffraction element can compensate for the light with a peripheral wavelength and cancel out color aberration, thereby making it possible to suppress a decrease in image resolution due to the light with a peripheral wavelength deviating from a specific wavelength (see, for example, JP-A-2017-167181).

When wavelength compensation is performed using two diffraction elements as disclosed in JP-A-2017-167181, the two diffraction elements are considered to be in an optical conjugated relationship. When the two diffraction elements are in a conjugated relationship, the diffraction angles of the two diffraction elements need to be the same. However, making the diffraction angles of the diffraction elements the same causes the display device to increase in size.

Therefore, the first diffraction element may be provided with a lens element, and wavelength compensation may be performed while varying the diffraction angles of the two diffraction elements using the refracting power of the lens member and the diffracting power of the first diffraction element. If, for example, the diffraction angle of the first diffraction element is smaller than the diffraction angle of the second diffraction element, the difference between the advancing directions of the zero-order light and the primary light emitted from the first diffraction element will be small. Thus, there is a problem in that zero-order light propagates through the optical system in the display device and is incident on the eye of the observer as a ghost, or a replica of a transmitted image.

SUMMARY

To solve the above-described problem, an image display device according to one aspect of the present disclosure includes, along an optical path of image light emitted from the image light generating device, a first optical unit having positive power, a second optical unit having positive power and including a first diffraction element of a reflective type, a third optical unit having positive power, and a fourth optical unit having positive power and including a second diffraction element of a reflective type, wherein the second optical unit includes a first light-transmitting member having optical power and provided at a first surface of the first diffraction element, and a light shielding member provided at a second surface of the first diffraction element.

The display device according to the above aspect preferably further includes, along an optical path of image light emitted from the image light generating device, an image light generating device, a first optical unit having positive power, a second optical unit having positive power and including a first diffraction element of a reflective type, a third optical unit having positive power, and a fourth optical unit having positive power and including a second diffraction element of a reflective type, wherein the second optical unit includes a first light-transmitting member having optical power and provided at a first surface of the first diffraction element, and a second light-transmitting member provided at a second surface of the first diffraction element.

In the display device according to the above-described aspect, the second light-transmitting member preferably includes a third surface at an opposite side thereof from the first diffraction element, the third surface having a shape different from that of the second surface of the first diffraction element.

In the display device according to the above-described aspect, the second light-transmitting member preferably includes a third surface at an opposite side thereof from the first diffraction element, the third surface having a same shape as that of the second surface of the first diffraction element.

In the display device according to the above-described aspect, the first light-transmitting member is preferably constituted of a plurality of optical members.

In the display device according to the aspect described above, the first light-transmitting member preferably further includes a bonding material for bonding the plurality of optical members together, and the bonding material preferably has a refractive index equal to a refractive index of the plurality of optical members.

In the display device according to the above-described aspect, a first diffraction angle of the image light at the first diffraction element preferably differs from a second diffraction angle of the image light at the second diffraction element.

In the display device according to the above-described aspect, the second diffraction angle is preferably greater than the first diffraction angle.

In the display device according to the above-described aspect, the first light-transmitting member is preferably constituted of a prism.

DESCRIPTION OF EXEMPLARY EMBODIMENTS

First Exemplary Embodiment

Exemplary embodiments of the present disclosure will be described below with reference to the accompanying drawings. Note that, in each of the drawings below, to make each of layers and each of members a recognizable size, each of the layers and each of the members are illustrated to be different from an actual scale and an actual angle.

Figure 1:
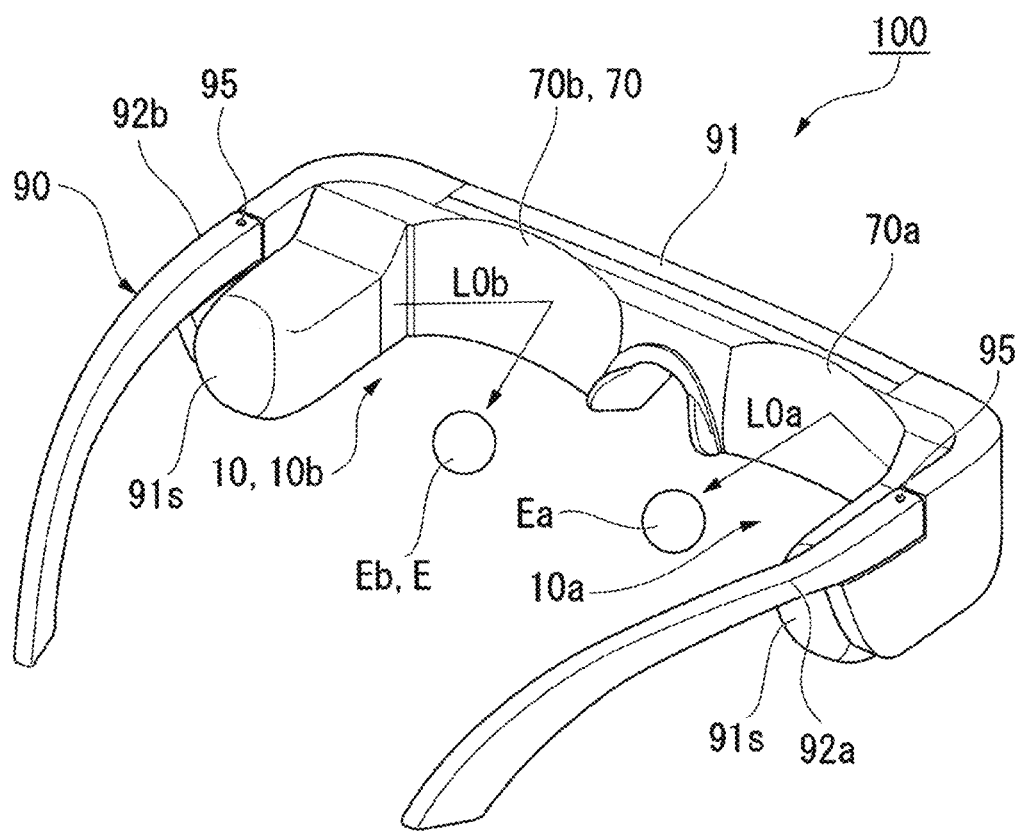
FIG. 1 is an external view of a display device according to a first exemplary embodiment.
Figure 2:
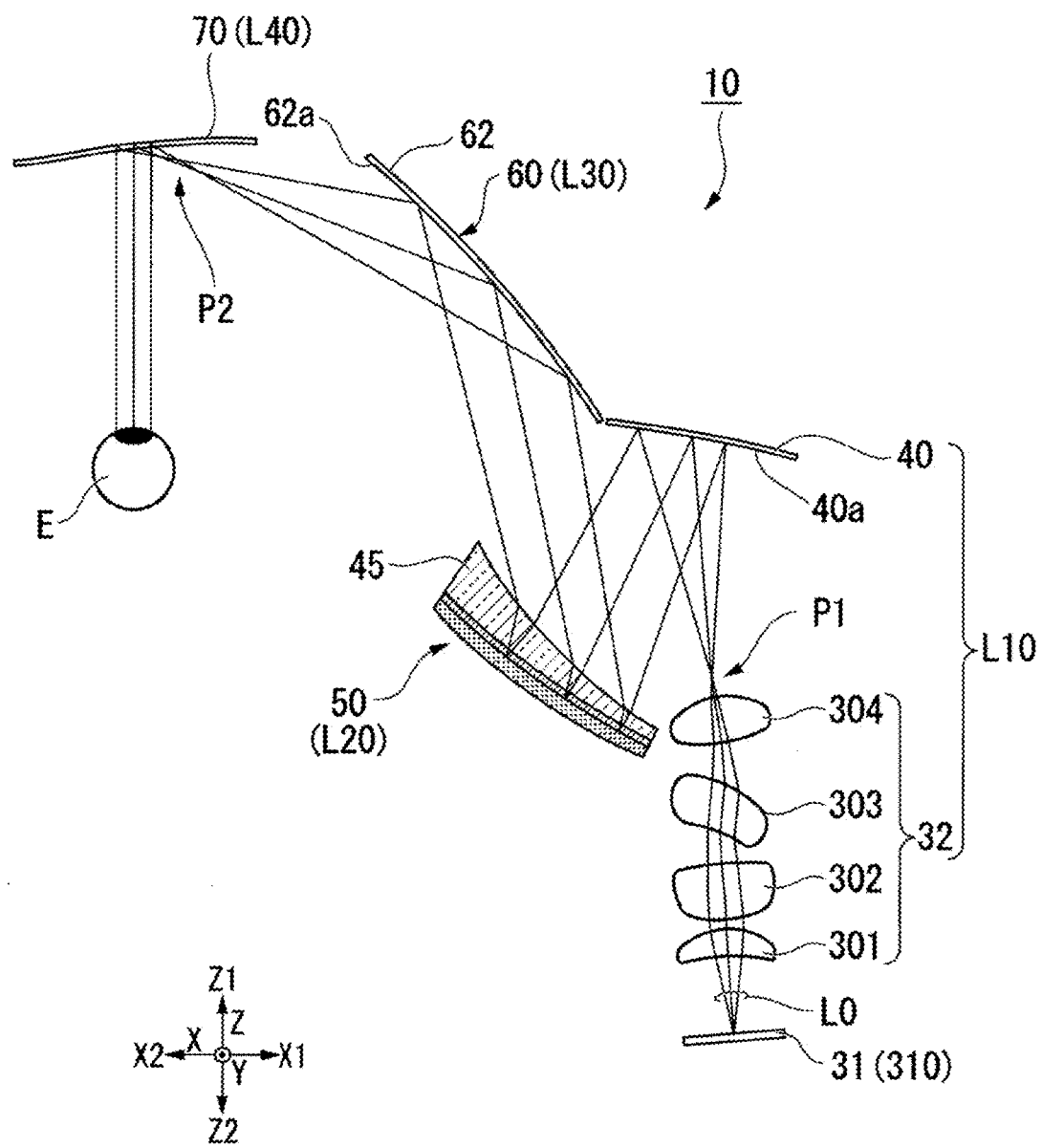
FIG. 2 is an explanatory view of an optical system of the display device.

FIG. 1 is an external view illustrating an aspect of a visual appearance of a display device 100 according to the present exemplary embodiment. FIG. 2 is an explanatory view illustrating one aspect of an optical system 10 of the display device 100 illustrated in FIG. 1. Note that, as necessary in the drawings used in the following description, a front-rear direction of an observer wearing the display device is a direction along a Z axis, the front of the observer wearing the display device is a front side Z1 as one side in the front-rear direction, and the rear of the observer wearing the display device is a rear side Z2 as the other side in the front-rear direction. A left and right direction with respect to the observer wearing the display device is defined as a direction along an X axis, one side in the left and right direction corresponding to the right direction of the observer wearing the display device is defined as a front side X1, and the other side in the left and right direction corresponding to the left direction of the observer wearing the display device is defined as a left side X2. An up and down direction with respect to the observer wearing the display device is defined as a direction along a Y axis, one side in the up and down direction corresponding to the up direction of the observer wearing the display device is defined as an up side Y1, and the other side in the left and right direction corresponding to the down direction of the observer wearing the display device is defined as a down side Y2.

The display device 100 illustrated in FIG. 1 is a head-mounted display device, and includes a right-eye optical system 10a that causes image light L0a to be incident on a right eye Ea and the left-eye optical system 10b that causes image light L0b to be incident on a left eye Eb. For example, the display device 100 is formed in a shape like glasses. Specifically, the display device 100 further includes a housing 90 that holds the right-eye optical system 10a and the left-eye optical system 10b. The display device 100 is mounted to the head of the observer by the housing 90.

In the display device 100, the housing 90 includes a frame 91, a temple 92a provided at the right side of the frame 91 and locked on the right ear of the observer, and a temple 92b provided at the left side of the frame 91 and locked on the left ear of the observer. The frame 91 includes storage spaces 91s on both sides of the frame 91, and the storage spaces 91s house components such as an image light projecting device that constitute the optical system 10 described below. The temples 92a and 92b are foldably coupled to the frame 91 by hinges 95.

The right-eye optical system 10a and the left-eye optical system 10b have the same basic configuration. Therefore, the right-eye optical system 10a and the left-eye optical system 10b will be described as the optical system 10 without distinction in the description below.

Next, a basic configuration of the optical system 10 of the display device 100 will be described with reference to FIG. 2.

As illustrated in FIG. 2, in the optical system 10 in the present exemplary embodiment, a first optical unit L10 having positive power, a second optical unit L20 having positive power, a third optical unit L30 having positive power, and a fourth optical unit L40 having positive power are disposed along an optical path of image light L0 emitted from an image light generating device 31.

In the present exemplary embodiment, the first optical unit L10 having positive power is constituted of a mirror 40 and a projection optical system 32. The second optical unit L20 having positive power is constituted of a first diffraction element 50 of the reflective type and a correction optical system 45. The third optical unit L30 having positive power is constituted of a light-guiding system 60. The fourth optical unit L40 having positive power is constituted of a second diffraction element 70 of a reflection type. In the present exemplary embodiment, the first diffraction element 50 and the second diffraction element 70 are reflection-type diffraction elements.

In the optical system 10, with focus on a traveling direction of the image light L0, the image light generating device 31 emits the image light L0 toward a projection optical system 32, and the projection optical system 32 emits the incident image light L0 toward a mirror 40. The mirror 40 includes a reflection surface 40a and reflects the image light L0 toward the first diffraction element 50. The image light L0 reflected by the reflection surface 40a of the mirror 40 passes through a correction optical system 45 and is incident on the first diffraction element 50. The image light L0 diffracted by the first diffraction element 50 is emitted toward a light guiding system 60. The light guiding system 60 emits the incident image light L0 into the second diffraction element 70, and the second diffraction element 70 emits the incident image light L0 toward the eye E of the observer.

In the present exemplary embodiment, the image light generating device 31 generates image light L0.

An aspect may be adopted where the image light generating device 31 includes a display panel 310 such as an organic electroluminescent display element. The aspect can provide a small-sized display device 100 capable of displaying a high-quality image. An aspect may be adopted where the image light generating device 31 includes an illumination light source (not illustrated) and a display panel 310 such as a liquid crystal display element that modulates illumination light emitted from the illumination light source. The aspect allows the illumination light source to be selected. Thus, the aspect has an advantage of increasing a degree of flexibility in a wavelength characteristic of the image light L0. Herein, an aspect may be adopted where the image light generating device 31 includes one display panel 310 that enables color display. Another aspect may be adopted where the image light generating device 31 includes a plurality of display panels 310 corresponding to respective colors and a synthesis optical system that synthesizes image light in respective colors emitted from the plurality of display panels 310. Furthermore, an aspect may be adopted where the image light generating device 31 modulates laser light using a micromirror device. In this case, image light is generated by scanning the laser light by driving the micromirror device.

The projection optical system 32 is an optical system that projects the image light L0 generated by the image light generating device 31, and is constituted of a first lens 301, a second lens 302, a third lens 303, and a fourth lens 304. The first lens 301, the second lens 302, the third lens 303, and the fourth lens 304 are constituted of a free-form lens or a rotationally symmetrical lens. The projection optical system 32 may be an eccentric optical system. In FIG. 2, an example is given of a case in which the number of lenses in the projection optical system 32 is four, but the number of lenses is not limited thereto. The projection optical system 32 may include five or more lenses. The lenses may be stuck together to form the projection optical system 32.

The light guiding system 60 includes a mirror 62 with a reflection surface 62a that is more recessed at the center than at peripheral portions. The light guiding system 60 has positive power. The mirror 62 includes a reflection surface 62a inclined obliquely in the front and rear direction. The reflection surface 62a includes a spherical surface, an aspherical surface, a free-form surface, or the like. In the present exemplary embodiment, the mirror 62 is a total reflection mirror with the reflection surface 62a including a free-form surface. However, the mirror 62 may be a half mirror, and in this case, the range in which external light is visible can be widened.

Next, the configuration of the second optical unit L20 including the first diffraction element 50 and the fourth optical unit L40 including the second diffraction element 70 will be described.

First, the configuration of the fourth optical unit L40 will be described below. Hereinafter, the configuration of the second diffraction element 70 constituting the fourth optical unit L40 will be mainly described.

Figure 3A:
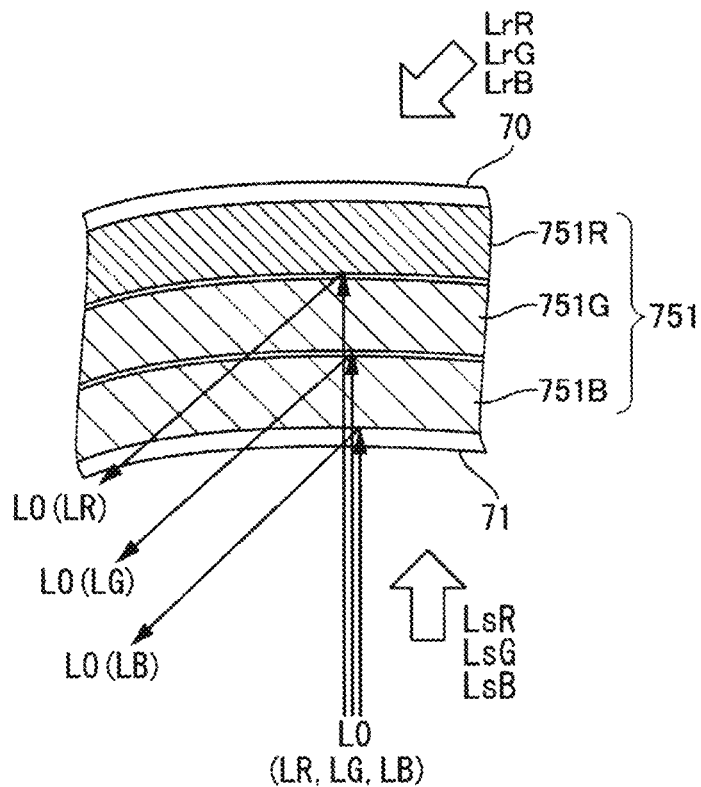
FIG. 3A is an explanatory view of interference fringes of a diffraction element.

FIG. 3A is an explanatory view of interference fringes 751 of the second diffraction element 70 illustrated in FIG. 2. As illustrated in FIG. 3A, the second diffraction element 70 is a partial reflection-type diffraction optical element made up of a reflection-type volume hologram element. Thus, the second diffraction element 70 constitutes a partial transmissive reflective combiner. Therefore, external light is also incident on the eye E via the second diffraction element 70, and thus the observer can recognize an image in which the image light L0 formed by the image light generating device 31 and the external light (background) are superimposed on each other.

The second diffraction element 70 faces the eye E of the observer. The incident surface 71 of the second diffraction element 70 on which the image light L0 is incident has a concave surface being recessed in a direction away from the eye E. In other words, the incident surface 71 has a shape having a central portion recessed and curved with respect to a peripheral portion in the incident direction of the image light L0. Thus, the image light L0 can be efficiently condensed toward the eye E of the observer.

The second diffraction element 70 includes the interference patterns 751 with a pitch corresponding to a specific wavelength. The interference patterns 751 are recorded as a difference in refractive index and other factors in a holographic photosensitive layer. The interference patterns 751 are inclined in one direction with respect to the incident surface 71 of the second diffraction element 70 so as to correspond to a specific incident angle. Therefore, the second diffraction element 70 diffracts and then deflects the image light L0 in a predetermined direction. The specific wavelength and the specific incident angle respectively correspond to a wavelength and an incident angle of the image light L0. The interference patterns 751 having the configuration can be formed by performing interference exposure on the holographic photosensitive layer by using reference light Lr and object light Ls.

In the present exemplary embodiment, the image light L0 is used for color display, and thus includes red light LR, green light LG, and blue light LB, which will be described later. Thus, the second diffraction element 70 includes the interference fringes 751R, 751G, and 751B having a pitch corresponding to the specific wavelength. For example, the interference patterns 751R are formed, for example, at a pitch corresponding to the red light LR with a wavelength of 615 nm included in a wavelength range from 580 nm to 700 nm. The interference patterns 751G are formed, for example, at a pitch corresponding to the green light LG with a wavelength of 535 nm included in a wavelength range from 500 nm to 580 nm. The interference patterns 751B are formed, for example, at a pitch corresponding to the blue light LB with a wavelength of 460 nm, for example, in a wavelength range from 400 nm to 500 nm. The above configuration can be achieved by forming a holographic photosensitive layer having sensitivity corresponding to the respective wavelengths, and performing two-beam interference exposure on the holographic photosensitive layer using the reference light LrR, LrG and LrB and the object light LsR, LsG and LsB having the respective wavelengths.

Figure 3B:
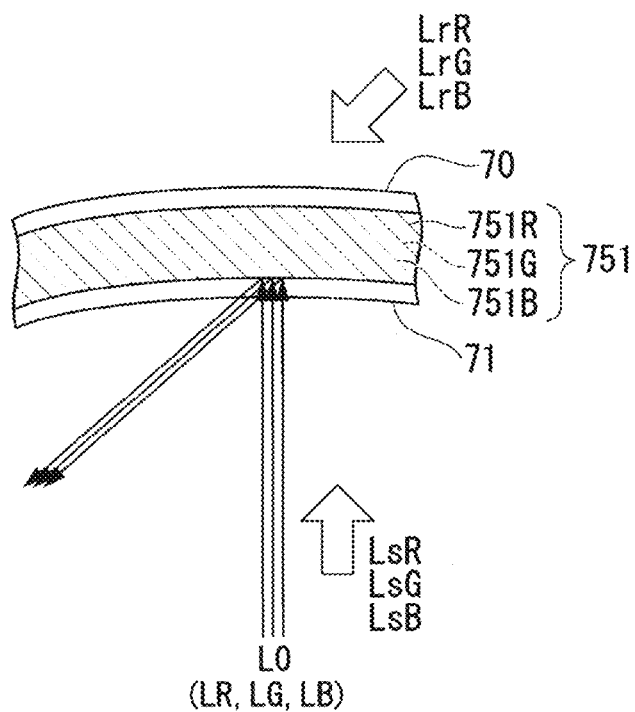
FIG. 3B is an explanatory view of a different embodiment of interference fringes of a diffraction element.

Note that, as illustrated in FIG. 3B, the interference fringes 751 in which the interference fringes 751R, 751G, and 751B are superimposed on each other in one layer may be formed by dispersing a photosensitive material having sensitivity corresponding to the respective wavelengths in the holographic photosensitive layer, and then performing interference exposure on the holographic photosensitive layer by using the reference light LrR, LrG, and LrB and the object light LsR, LsG, and LsB having the respective wavelengths. Further, light having a spherical wave may be used as the reference light LrR, LrG, and LrB and the object light LsR, LsG, and LsB.

Next, the configuration of the second optical unit L20 will be described below.

Figure 4:
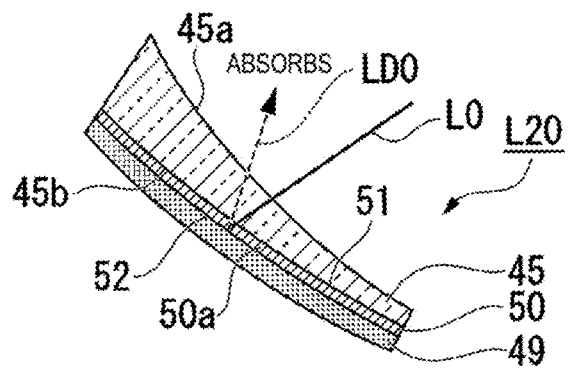
FIG. 4 is a cross-sectional view illustrating the configuration of a main portion of a second optical unit.

FIG. 4 is a cross-sectional view illustrating the configuration of main portion of the second optical unit L20. As illustrated in FIG. 4, the second optical unit L20 includes the first diffraction element 50, the correction optical system 45 and a slight shielding member 49. The first diffraction element 50 is constituted of a reflection-type volume hologram element having the same basic configuration as the second diffraction element 70. Thus, the first diffraction element 50 includes the interference fringe 50a having a pitch corresponding to a specific wavelength.

In the present exemplary embodiment, the first diffraction element 50 is integrally formed with the correction optical system 45 as a first light-transmitting member. In the present exemplary embodiment, the correction optical system 45 is composed of a prism made of a light-transmitting material such as plastic or glass. The correction optical system 45 has optical power that deflects the image light L0. The correction optical system 45 corresponds to the first light-transmitting member. The correction optical system 45 is provided on the incident surface (first surface) 51 of the first diffraction element 50.

The first diffraction element 50 is affixed to a rear surface 45b of the correction optical system 45.

A front surface 45a of the correction optical system 45 functions as a light incident/emission surface. The front surface 45a is composed of a surface having positive optical power. Here, a surface having positive optical power refers to a lens shape such as a spherical surface, an aspherical surface, a cylindrical surface or a free form surface. Note that the front surface 45a may be a flat surface provided that the front surface 45a has positive optical power.

The light shielding member 49 is provided on the rear surface (second surface) 52 of the first diffraction element 50. The light blocking member 49 is constituted of a black coating film with light-absorbing properties. Note that a light-absorbing plastic member may be attached to the rear surface 52 to configure the light shielding member 49.

Figure 5:
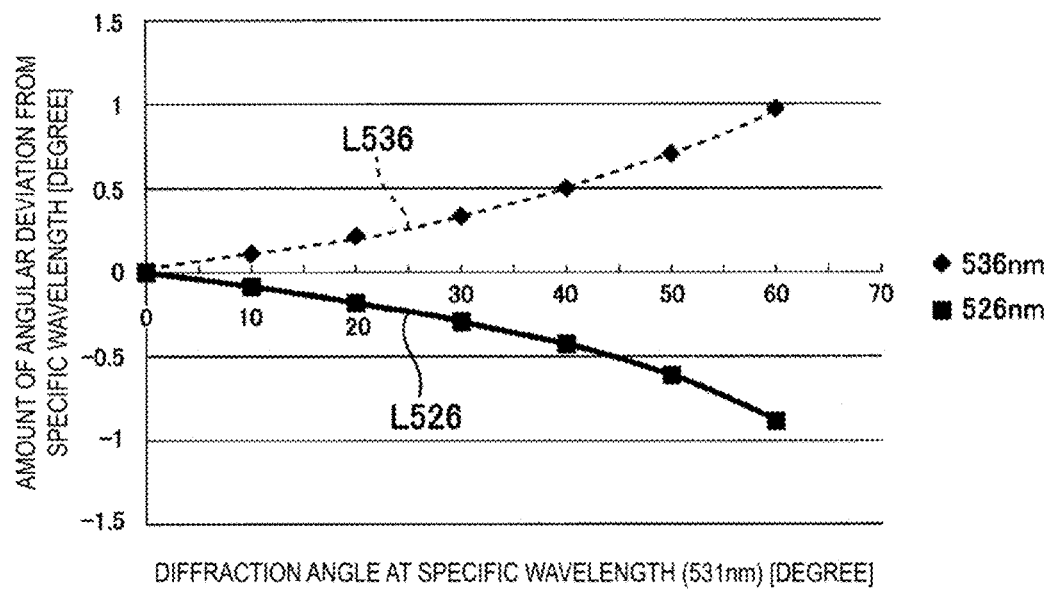
FIG. 5 is a graph showing diffraction characteristics in a volume hologram.

FIG. 5 is a diagram for explaining diffraction characteristics in the volume hologram constituting the first diffraction element 50 and the second diffraction element 70. FIG. 5 illustrates a difference in diffraction angle between a specific wavelength and a peripheral wavelength when a light beam is incident on one point on the volume hologram. In FIG. 5, when the specific wavelength is 531 nm, a deviation in the diffraction angle of light with a peripheral wavelength of 526 nm is indicated by a solid line L526, and a deviation in the diffraction angle of light with a peripheral wavelength of 536 nm is indicated by a dashed line L536. As illustrated in FIG. 5, even when a light beam is incident on the same interference fringes recorded in the hologram, a light beam with a longer wavelength diffracts more greatly and a light beam with a shorter wavelength is less likely to diffract. Thus, when two diffraction elements, namely, the first diffraction element 50 and the second diffraction element 70 are used as in the present exemplary embodiment, proper wavelength compensation fails to be achieved unless considerations are given for the ray angle of incident light with a wavelength larger or smaller than the specific wavelength. In other words, color aberration occurring in the second diffraction element 70 fails to be canceled.

In the optical system 10 illustrated in FIG. 2, as described in JP-A-2017-167181, wavelength compensation, namely, a color aberration can be canceled because an incident direction and the like to the second diffraction element 70 is made appropriate in accordance with whether a sum of the number of times of formation of an intermediate image between the first diffraction element 50 and the second diffraction element 70 and the number of times of reflection by the mirror 62 is odd or even.

Figure 6:
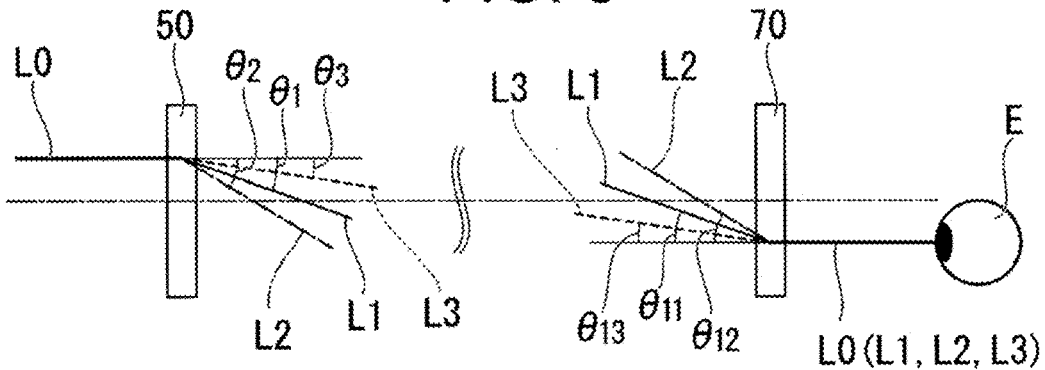
FIG. 6 is an explanatory view of light emitted from a second diffraction element when diffraction angles are the same.

Here, a case in which diffraction angles of the first diffraction element 50 and the second diffraction element 70 are the same is considered. In other words, a case in which the diffraction angles of the first diffraction element 50 and the second diffraction element 70 are formed by the same diffraction element is considered. FIG. 6 is an explanatory view of light emitted from the second diffraction element 70 when the diffraction angles of the first diffraction element 50 and the second diffraction element 70 are the same. Note that, in addition to the light L1 (solid line) with a specific wavelength of the image light L0, FIG. 6 also illustrates light L2 (dot-and-dash line) on a long wavelength side and light L3 (dotted line) on a short wavelength side with respect to the specific wavelength.

As illustrated in FIG. 6, the image light L0 incident on the first diffraction element 50 is diffracted and then deflected by the first diffraction element 50. At this time, in the first diffraction element 50 formed of the volume hologram as illustrated in FIG. 6, the light L2 on the long wavelength side with respect to the specific wavelength has a diffraction angle $\theta_2$ greater than a diffraction angle $\theta_1$ of the light L1 with the specific wavelength. Further, the light L3 on the short wavelength side with respect to the specific wavelength has a diffraction angle $\theta_3$ smaller than the diffraction angle $\theta_1$ of the light L1 with the specific wavelength. Therefore, the image light L0 emitted from the first diffraction element 50 is deflected and dispersed at each wavelength.

The image light L0 emitted from the first diffraction element 50 is incident on the second diffraction element 70 via the light-guiding system 60, and is then diffracted and deflected by the second diffraction element 70. At this time, on the optical path from the first diffraction element 50 to the second diffraction element 70, an intermediate image is formed once, and reflection by the mirror 62 is performed once. Therefore, when the incident angle is defined as an angle between the image light L0 and a normal line of an incident surface of the second diffraction element 70, the light L2 on the long wavelength side with respect to the specific wavelength has an incident angle $\theta_{12}$ larger than the incident angle $\theta_{11}$ of the light L1 with the specific wavelength, and the light L3 on the short wavelength side with respect to the specific wavelength has an incident angle $\theta_{13}$ smaller than the incident angle $\theta_{11}$ of the light L1 with the specific wavelength. As described above, the light L2 on the long wavelength side with respect to the specific wavelength has the diffraction angle $\theta_2$ larger than the diffraction angle $\theta_1$ of the light L1 with the specific wavelength. Further, the light L3 on the short wavelength side with respect to the specific wavelength has the diffraction angle $\theta_3$ smaller than the diffraction angle $\theta_1$ of the light L1 with the specific wavelength.

Accordingly, the light L2 on the long wavelength side with respect to the specific wavelength is incident on the first diffraction element 50 at a larger incident angle than the light L1 with the specific wavelength. However, the light L2 on the long wavelength side with respect to the specific wavelength has a larger diffraction angle than the light L1 with the specific wavelength, and as a result, the light L2 on the long wavelength side with respect to the specific wavelength and the light L1 with the specific wavelength are substantially parallel when being emitted from the second diffraction element 70. In contrast, the light L3 on the short wavelength side with respect to the specific wavelength is incident on the first diffraction element 50 at a smaller incident angle than the light L1 with the specific wavelength. However, the light L3 on the short wavelength side with respect to the specific wavelength has a smaller diffraction angle than the light L1 with the specific wavelength, and as a result, the light L3 on the short wavelength side with respect to the specific wavelength and the light L1 with the specific wavelength are substantially parallel when being emitted from the second diffraction element 70. Thus, as illustrated in FIG. 6, the image light L0 emitted from the second diffraction element 70 is incident as substantially parallel light on the eye E of the observer. As a result, misalignment of the image formation position in the retina E0 at each wavelength can be suppressed, and color aberration generated by the second diffraction element 70 can be canceled.

When the color aberration is canceled by setting the diffraction angles of the first diffraction element 50 and the second diffraction element 70 to be the same in this way, a conjugated relationship is established between the first diffraction element 50 and the second diffraction element 70. Here, the conjugated relationship refers to a relationship in which light emitted from a first position of the first diffraction element 50 is condensed by the light-guiding system 60 having positive power, and is incident on a second position corresponding to the first position of the second diffraction element 70.

However, when the conjugated relationship is established by setting the diffraction angles of the first diffraction element 50 and the second diffraction element 70 to be the same as described above, the following problem arises.

Figure 7A:
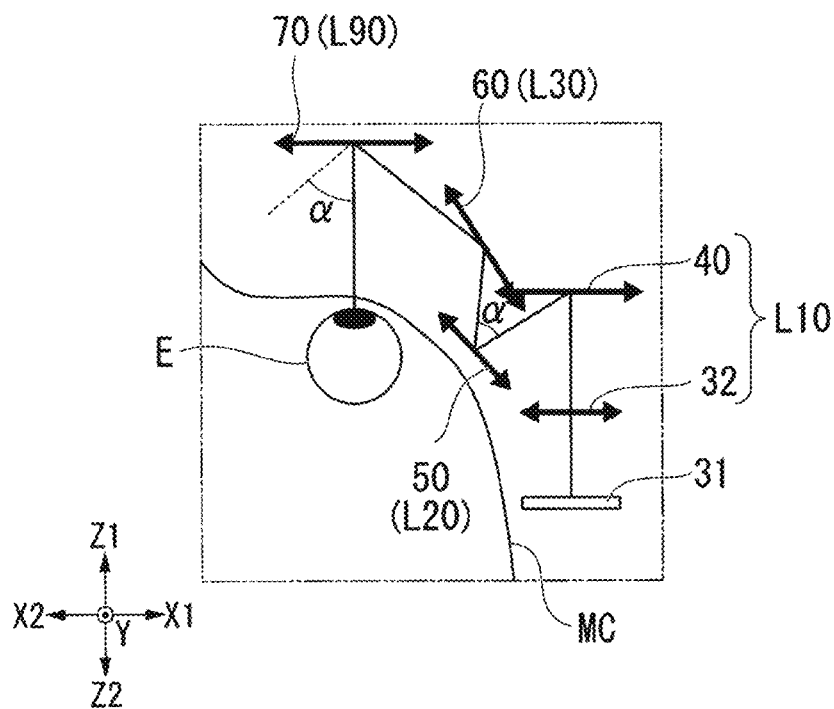
FIG. 7A is an explanatory view illustrating a case where diffraction angles of a first diffraction element and the second diffraction element are set to small angles.
Figure 7B:
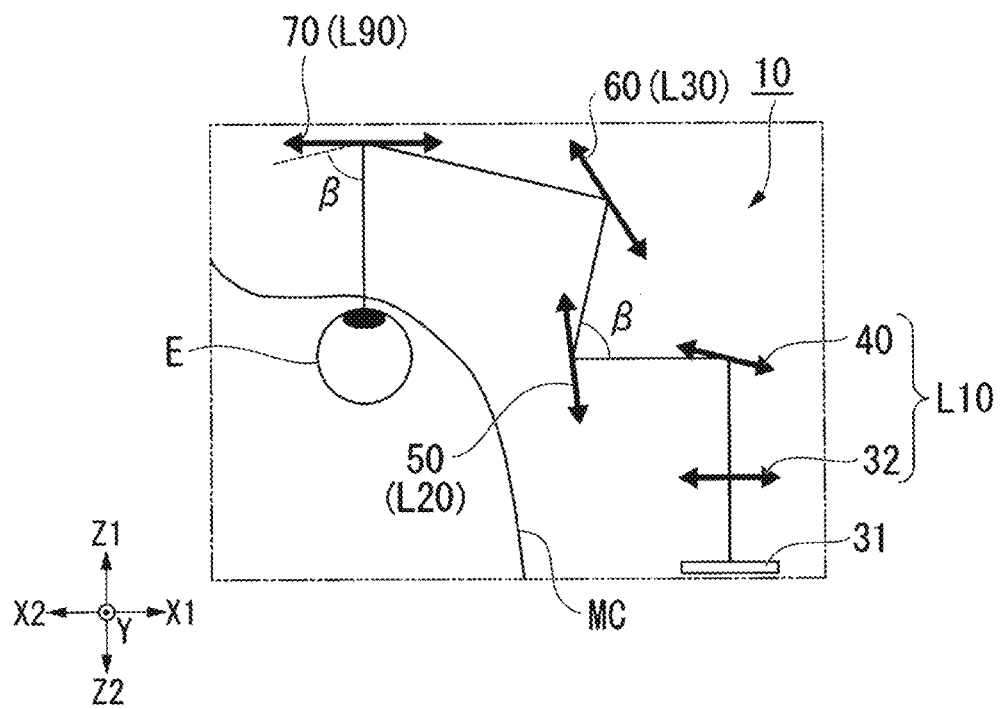
FIG. 7B is an explanatory view illustrating a case where the diffraction angles of the first diffraction element and the second diffraction element are set to large angles.

FIG. 7A is an explanatory view illustrating a case where the diffraction angles of the first diffraction element 50 and the second diffraction element 70 are both set to a small angle. FIG. 7B is an explanatory view illustrating a case where the diffraction angles of the first diffraction element 50 and the second diffraction element 70 are both set to a large angle. Note that, in FIGS. 7A and 7B, each optical unit disposed along the optical axis has been simplified and is indicated by a thick arrow.

In FIG. 7A, the diffraction angles of the first diffraction element 50 and the second diffraction element 70 are set to a small angle $\alpha$. In FIG. 7B, the diffraction angles of the first diffraction element 50 and the second diffraction element 70 are set to an angle $\beta$ greater than the angle $\alpha$.

As illustrated in FIG. 7A, when the diffraction angles of the first diffraction element 50 and the second diffraction element 70 are set to the small angle $\alpha$, it is possible to reduce the size of the display device by disposing each optical member along a contour MC of the face of the observer. However, as illustrated in FIG. 7A, there is a problem in that the mirror 40 and the light-guiding system 60 interfere with each other and part of the image light is missing.

On the other hand, as illustrated in FIG. 7B, when the diffraction angles of the first diffraction element 50 and the second diffraction element 70 are set to the large angle R, it is possible to avoid interference between the mirror 40 and the light-guiding system 60 because the gap between the mirror 40 and the light-guiding system 60 is widened. However, each optical member is disposed in a position away from the contour MC of the face of the observer, which results in a problem of increasing the size of the display device.

Figure 8:
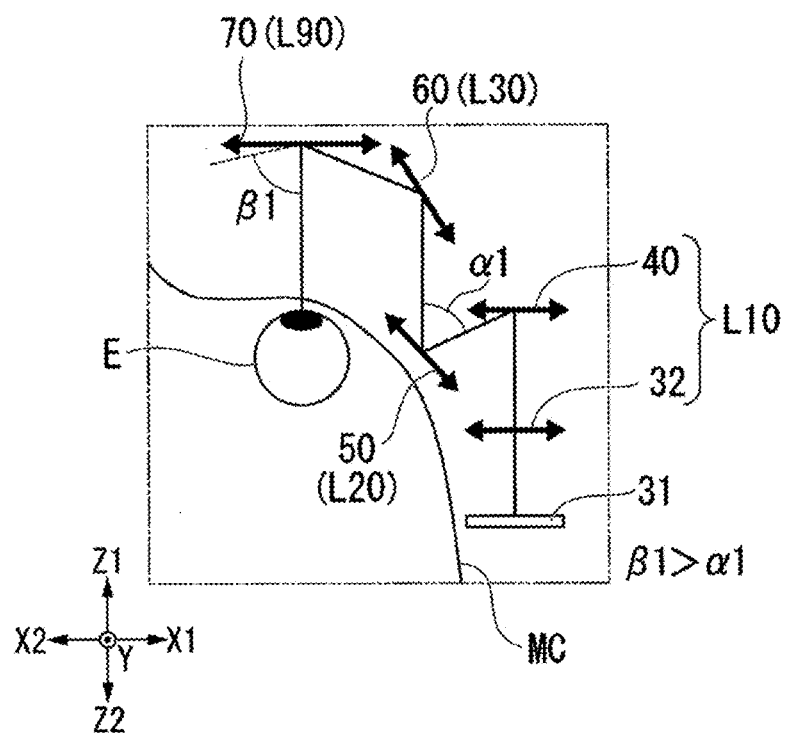
FIG. 8 is a diagram illustrating the relationship between the diffraction angles of the first diffraction element and the second diffraction element.

Thus, in the optical system 10 according to the present exemplary embodiment, the first diffraction element 50 and the second diffraction element 70 have different diffraction angles. FIG. 8 is a diagram illustrating the relationship between the diffraction angles of the first diffraction element 50 and the second diffraction element 70 in the optical system 10 according to the present exemplary embodiment.

As illustrated in FIG. 8, in the optical system 10 according to the present exemplary embodiment, a first diffraction angle $\alpha 1$ of the image light L0 in the first diffraction element 50 and a second diffraction angle $\beta 1$ of the image light L0 in the second diffraction element 70 are different. Specifically, the second diffraction angle $\beta 1$ is greater than the first diffraction angle $\alpha 1$. According to the optical system 10 in the present exemplary embodiment, by setting the second diffraction angle $\beta 1$ to be greater than the first diffraction angle $\alpha 1$, the image light L0 is incident on the eye E of the observer at a large angle of view, and each optical unit can also be disposed along the contour MC of the face of the observer. Therefore, the size of the display device including the optical system 10 can be reduced.

As described above, the display device can be made smaller by setting the second diffraction angle $\beta 1$ to be greater than the first diffraction angle $\alpha 1$. However, this creates a new problem in which resolution, which will be described below, decreases.

Figure 9:
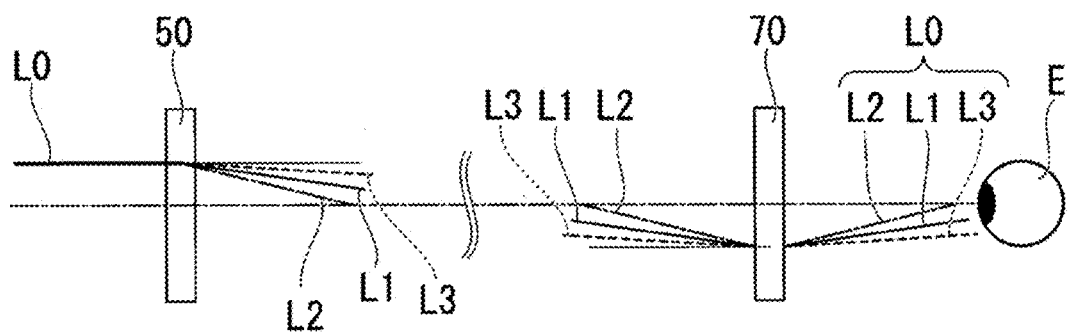
FIG. 9 is an explanatory view of light emitted from the second diffraction element when the diffraction angles are different.

FIG. 9 is an explanatory view of light emitted from the second diffraction element 70 when the diffraction angles of the first diffraction element 50 and the second diffraction element 70 are different. Note that it is assumed that the correction optical system 45 is not disposed on the optical path illustrated in FIG. 9. FIG. 9 illustrates light L1 (solid line) with a specific wavelength among the imaging light L0 in addition to light L2 (dot-and-dash line) on a long wavelength side and light L3 (dotted line) on a short wavelength side with respect to the specific wavelength.

As illustrated in FIG. 9, the image light L0 incident on the first diffraction element 50 is diffracted and then deflected by the first diffraction element 50. At this time, as illustrated in FIG. 9, the image light L0 emitted from the first diffraction element 50 is deflected and dispersed at each wavelength.

The image light L0 emitted from the first diffraction element 50 is diffracted and then deflected by the second diffraction element 70. At this time, because the diffraction angle of the second diffraction element 70 is different from the diffraction angle of the first diffraction element 50, the light L2 on the long wavelength side and the light L3 on the short wavelength side with respect to the light L1 with the specific wavelength are emitted in a widened state, as illustrated in FIG. 9. In this way, as illustrated in FIG. 9, the image light L0 emitted from the second diffraction element 70 shifts in terms of an image formation position in the retina E0 at each wavelength. This creates a problem in that color aberration cannot be canceled and resolution of the image light L0 decreases.

To resolve this problem, as illustrated in FIG. 2, the optical system 10 in the present exemplary embodiment includes, between the first optical unit L10 and the fourth optical unit L40 on the optical path of the image light L0, the correction optical system 45 that corrects an incident angle of the image light L0 with respect to the second diffraction element 70. More specifically, the correction optical system 45 is integrally provided on a light incident side and a light exit side of the first diffraction element 50 constituting the second optical unit L20. The front surface 45a of the correction optical system 45 functions as a light incident/exit surface on which the image light L0 is incident or emitted.

The correction optical system 45 has a shape in which a side closer to the eye E of the observer is thick and a side further from the eye E of the observer is thin. In other words, the correction optical system 45 has a shape in which a side closer to the second diffraction element 70 located on the left side X2 with respect to the first diffraction element 50 is thick, and a side closer to the image light generating device 31 located on the right side X1 with respect to the first diffraction element 50 is thin.

The front surface 45a is constituted of a surface inclined so as to protrude further toward the front side Z1 closer to the eye E of the observer. In other words, the front surface 45a is constituted of a surface inclined so as to protrude further toward the front side Z1 closer to the second diffraction element 70.

Next, functions of the correction optical system 45 will be described with reference to the drawings.

Figure 10A:
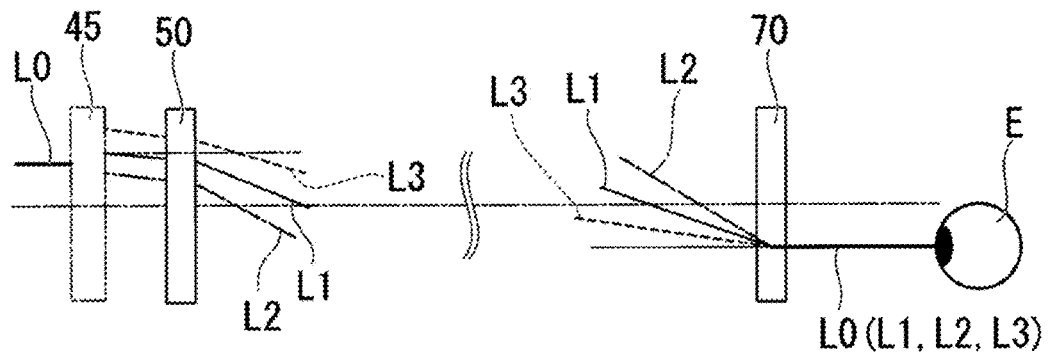
FIG. 10A is a diagram illustrating a first function of a correction optical system.
Figure 10B:
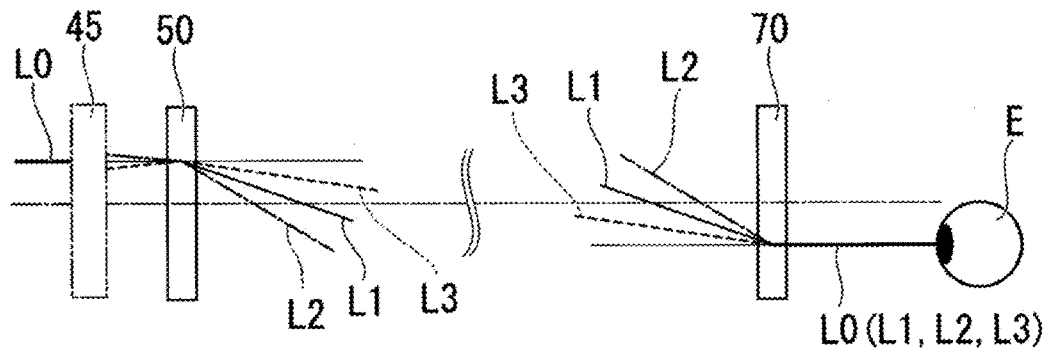
FIG. 10B is a diagram illustrating a second function of the correction optical system.
Figure 10C:
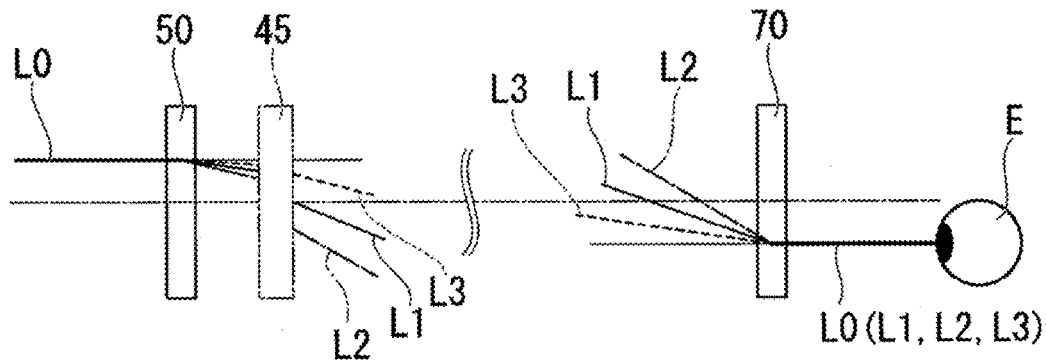
FIG. 10C is a diagram illustrating a third function of the correction optical system.

FIG. 10A is a diagram illustrating a first function of the correction optical system 45. FIG. 10B is a diagram illustrating a second function of the correction optical system 45. FIG. 10C is a diagram illustrating a third function of the correction optical system 45. Note that, in FIGS. 10A, 10B, and 10C, it is assumed that the second diffraction angle β1 of the second diffraction element 70 is greater than the first diffraction angle α1 of the first diffraction element 50.

Figure 11:
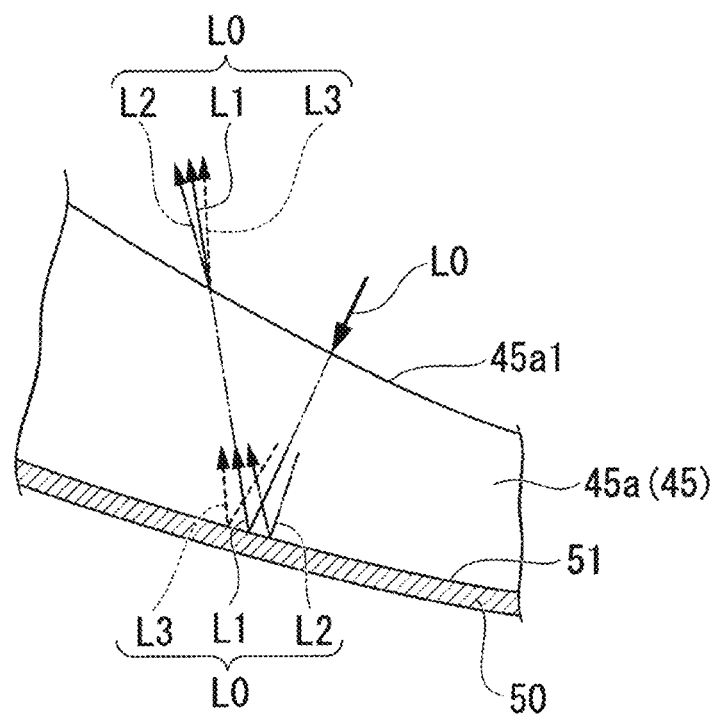
FIG. 11 is an enlarged view of the correction optical system.

FIG. 11 is an enlarged view of the correction optical system 45. In addition to the light L1 (solid line) with the specific wavelength of the image light L0, FIG. 11 also illustrates the light L2 (dot-and-dash line) on the long wavelength side with respect to the specific wavelength and the light L3 (dotted line) on the short wavelength side with respect to the specific wavelength.

As illustrated in FIG. 10A, the correction optical system 45 is provided on the light incident side of the first diffraction element 50 on the optical path of the image light L0. As a result, the image light L0 is incident on the correction optical system 45 from the front surface 45a as illustrated in FIG. 11. At this time, when the image light L0 is incident on the correction optical system 45 due to the light dispersing, the light L3 on the short wavelength side is refracted the most, the light L2 on the long wavelength side is refracted the least, and the light L1 with the specific wavelength is refracted by the magnitude between the light L3 on the short wavelength side and the light L2 on the long wavelength side. The light L1 with the specific wavelength, the light L2 on the long wavelength side and the light L3 on the short wavelength side pass through the correction optical system 45 to be incident on the first diffraction element 50.

The light L1 with the specific wavelength, the light L2 on the long wavelength side and the light L3 on the short wavelength side are dispersed by the correction optical system 45 and are thus incident on the first diffraction element 50 at different places. The angles at which the light L1 with the specific wavelength, the light L2 on the long wavelength side and the light L3 on the short wavelength side are incident on the first diffraction element 50 differ from each other.

As described above, by dispersing the image light L0, the correction optical system 45 can change the positions and angles at which the light L1 with the specific wavelength, the light L2 on the long wavelength side and the light L3 on the short wavelength side are incident on the first diffraction element 50.

The diffraction angle of the volume hologram constituting the first diffraction element 50 varies depending on location. The correction optical system 45 corrects, for example, the position at which each of the light L1 with the specific wavelength, the light L2 on the long wavelength side and the light L3 on the short wavelength side in the image light L0 are incident on the first diffraction element 50 to an appropriate position. In this way, the correction optical system 45 can correct the incident angle of the image light L0 emitted from the first diffraction element 50 with respect to the second diffraction element 70 such that light with a specific wavelength and light with a peripheral wavelength are substantially parallel as illustrated in FIG. 10A when being emitted from the second diffraction element 70. In other words, the correction optical system 45 has a first function of "performing correction so as to change the position at which the image light L0 is incident on the first diffraction element 50 for each wavelength" as illustrated in FIG. 10A.

As illustrated in FIG. 10B, the correction optical system 45 corrects the angle at which the image light L0 is incident on the first diffraction element 50 at each wavelength, namely, for each of the light L1 with the specific wavelength, the light L2 on the long wavelength side and the light L3 on the short wavelength side. As illustrated in FIG. 11, the angle at which the image light L0 is incident on the first diffraction element 50 is corrected by previously angling the image light L0 with respect to the light L2 on the long wavelength side and the light L3 on the short wavelength side. In this way, the correction optical system 45 can cause the image light L0 to be incident on the first diffraction element 50 such that light with a specific wavelength and light with a peripheral wavelength are substantially parallel as illustrated in FIG. 9 when being emitted from the second diffraction element 70. In other words, the correction optical system 45 has the second function of "correcting the angle at which the image light L0 is incident on the first diffraction element 50 for each wavelength" illustrated in FIG. 10B.

As illustrated in FIG. 10C, the correction optical system 45 is provided between the first diffraction element 50 and the second diffraction element 70 on the optical path of the image light L0. Thus, the image light L0 emitted from the first diffraction element 50 is incident on the correction optical system 45 in a dispersed state at each wavelength.

As illustrated in FIG. 11, because the diffraction angle of the first diffraction element 50 varies depending on location, the light L1 with the specific wavelength, the light L2 on the long wavelength side and the light L3 on the short wavelength side are diffracted at different angles. The light L1 with the specific wavelength, the light L2 on the long wavelength side and the light L3 on the short wavelength side that are diffracted by the first diffraction element 50 pass through the correction optical system 45 again to be emitted from the front surface 45a. The light L1 with the specific wavelength, the light L2 on the long wavelength side and the light L3 on the short wavelength side are emitted from the correction optical system 45 in different directions. In this way, the correction optical system 45 deflects the image light L0 in a different direction for each wavelength, and thus the angles at which the light L1 with the specific wavelength, the light L2 on the long wavelength side and the light L3 on the short wavelength side are incident on the second diffraction element 70 can each be adjusted.

The correction optical system 45 corrects the angle at which the image light L0 dispersed at each wavelength is incident on the second diffraction element 70 by compensating for a shortage in diffraction angle of the image light L0 at the first diffraction element 50. In this way, the correction optical system 45 can correct the emission angle of the image light L0 dispersed at each wavelength such that light with a specific wavelength and light with a peripheral wavelength are substantially parallel as illustrated in FIG. 9 when being emitted from the second diffraction element 70. In other words, the correction optical system 45 has the third function of "performing correction so as to compensate for a shortage in diffraction angle of the image light L0 at the first diffraction element 50" illustrated in FIG. 10C.

The correction optical system 45 described above achieves the effects illustrated in FIGS. 10A, 10B and 10C. Thus, the correction optical system 45 can cause the image light L0 emitted from the second diffraction element 70 to be incident on the eye E of the observer as substantially parallel light. Thus, misalignment of image formation in the retina E0 at each wavelength can be suppressed, and a color aberration generated by the second diffraction element 70 can be canceled. Therefore, by adopting the second optical unit L20 including the correction optical system 45, high image quality can be acquired by canceling color aberration generated by the second diffraction element 70 while adopting a structure in which the diffraction angles of the first diffraction element 50 and the second diffraction element 70 are different. In other words, the size reduction of the display device 100 can be achieved by setting diffraction angles to be different while appropriately performing wavelength compensation by the two diffraction elements.

As described above, the optical system 10 in the present exemplary embodiment can have the functions illustrated in FIGS. 10A, 10B and 10C by including the correction optical system 45. Thus, the optical system 10 in the present exemplary embodiment can accurately correct the angle at which the image light L0 is incident on the second diffraction element 70 by using the correction optical system 45.

Therefore, even when the first diffraction element 50 and the second diffraction element 70 having different diffraction angles are used, the optical system 10 in the present exemplary embodiment can cause the image light L0 emitted from the second diffraction element 70 to be incident on the eye E of the observer as substantially parallel light by the correction optical system 45. Thus, misalignment of image formation in the retina E0 at each wavelength can be suppressed, and a color aberration generated by the second diffraction element 70 can be canceled. As a result, deterioration in resolution of image light can be prevented.

In other words, the optical system 10 in the present exemplary embodiment can acquire high image quality by canceling a color aberration generated by the second diffraction element 70 while adopting a structure in which the diffraction angles of the first diffraction element 50 and the second diffraction element 70 are different. In other words, by setting different diffraction angles while appropriately performing wavelength compensation using the two diffraction elements, the optical system 10 in the present exemplary embodiment can achieve size reduction of the display device 100.

Incidentally, the image light L0 emitted from the first diffraction element 50 includes zero-order light and first or higher order diffraction light. Here, "zero-order light" refers to light reflected without diffraction by the first diffraction element 50. Note that the ratio of second or higher order diffraction light contained in the image light L0 is very low, and therefore only zero-order light and first-order light are considered herein.

An ideal state in which zero-order light is not considered has been described above, but hereinafter, a problem caused by zero-order light included in the image light L0 and a specific means for eliminating this problem will be described.

Typically, the difference between the angle of diffraction of zero-order light and first-order light is large. Thus, zero-order light will propagate within the optical system and is not incident on the eye of the observer. However, in the optical system 10 in the present exemplary embodiment, the diffraction angle of the first diffraction element 50 is smaller than the diffraction angle of the second diffraction element 70 as described above. Therefore, the difference in emission directions of the zero-order light and the first-order light included in the image light L0 emitted from the first diffraction element 50 is small, and thus, as described below, there is a problem in that the zero-order light propagates in the optical system and is incident on the eye of the observer.

Figure 12:
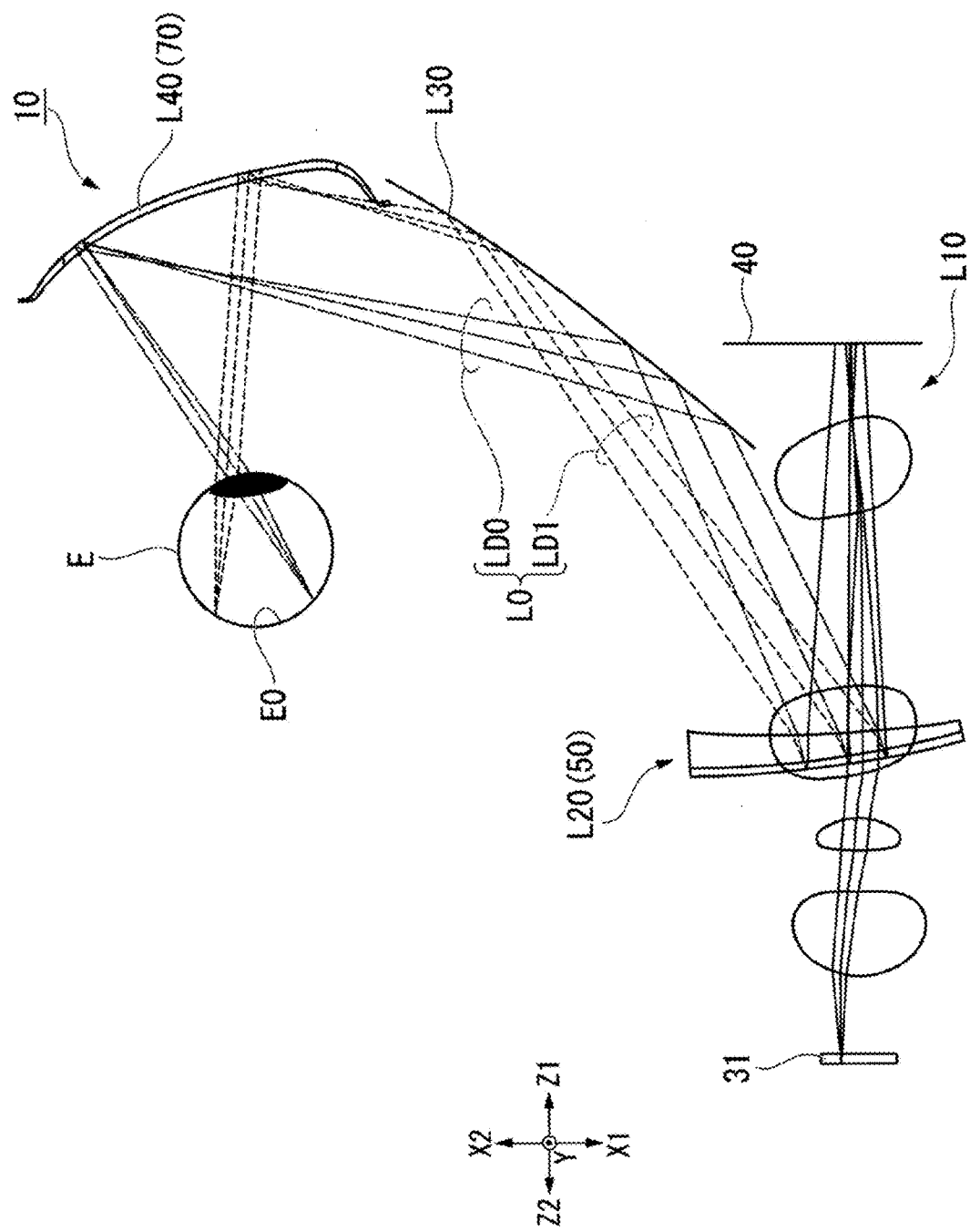
FIG. 12 is a diagram illustrating imaging positions in zero-order light and first-order light.

FIG. 12 is a diagram illustrating imaging positions in the zero-order light and the first-order light. FIG. 12 shows results of simulation using an optical model equivalent to the optical system 10 in the present exemplary embodiment, and illustrates imaging positions on the retina E0 of the eye E of the observer in the zero-order light and the first-order light emitted from the first diffraction element 50. In the optical model used in the simulation, when the image light L0 is viewed along the travel direction of the image light L0, the image light L0 travels at a substantially constant height until reaching the mirror 40 in the first optical unit L10. Then, after the optical path is bent in the vertical direction by the mirror 40, the image light L0 advances at a different height in the vertical direction than before being incident on the mirror 40 and reaches the second optical unit L20, the third optical unit L30 and the fourth optical unit L40. Further, the optical model used in the simulation has a configuration in which the light shielding member 49 described below is omitted from the configuration of the optical system 10.

In FIG. 12, the image light L0 emitted from the image light generating device 31 and entering the first diffraction element 50 is indicated by a solid line, zero-order light LD0 included in the image light L0 emitted from the first diffraction element 50 is indicated by a dot-dash line, and first-order light LD1 included in the image light L0 emitted from the first diffraction element 50 is indicated by a dashed line.

Figure 13:
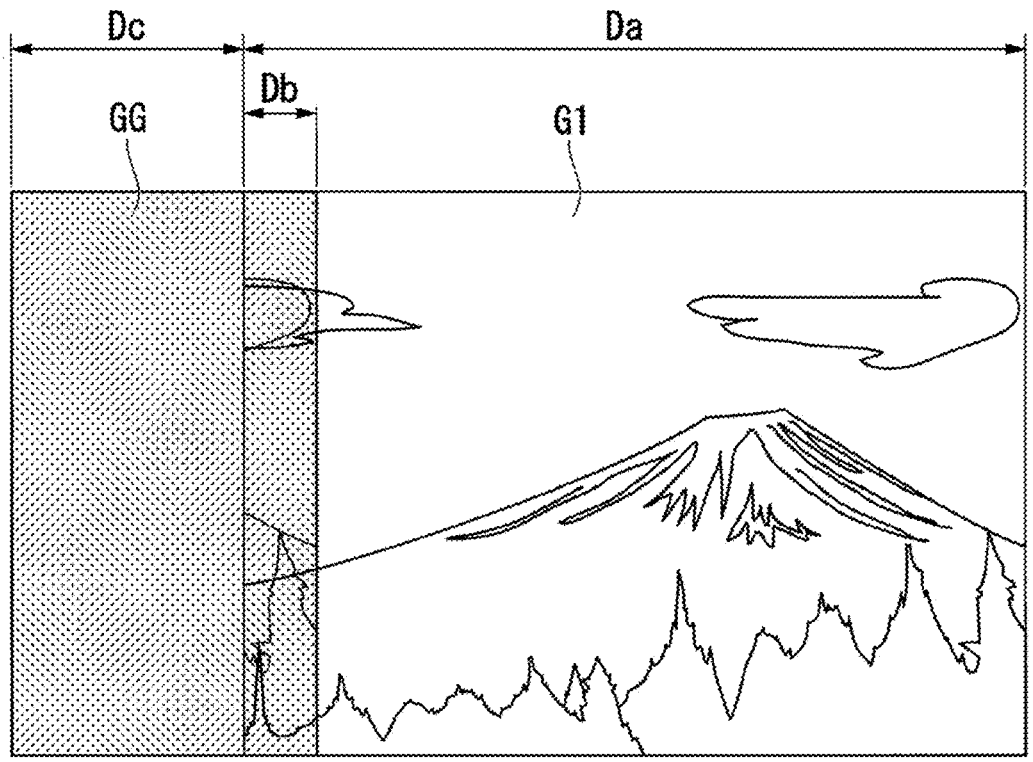
FIG. 13 is a diagram illustrating an image visible to an observer.

FIG. 13 is a diagram illustrating an image visible to an observer in accordance with the simulation results illustrated in FIG. 12.

As illustrated in FIG. 12, the zero-order light LD0 is incident on the eye E of the observer from the nose side, while the first-order light LD1 is incident on the eye E of the observer from the ear side.

In this case, as illustrated in FIG. 13, when the observer views the image light L0, the observer views an image to the right of the image G1 as a blurry image at the position indicated by the hatching GG in addition to the image G1 of the primary light LD1. The image that appears at the position indicated by the hatching GG is caused by the zero-order light LD0. In other words, the zero-order light LD0 is visible as a ghost on the image G1 visible by the observer, which causes image quality to decrease. Note that the zero-order light LD0 is constituted of light reflected without being diffracted on the front surface of the first diffraction element 50, that is, the incident surface 51 or the rear surface 52. In FIG. 13, a ghost is generated at a ratio of Db/Da=5.6%, (Dc+Db)/Da=33.1%, where the lateral width of the image G1 is Da, the lateral width of the image caused by the zero-order light LD0 is Dc, and the overlapping width between the image G1 and the image caused by the zero-order light LD0 is Db.

In order to prevent the ghost described above, the optical system 10 in the present exemplary embodiment includes the light shielding member 49 provided on the rear surface 52 of the first diffraction element 50. As illustrated in FIG. 4, according to the optical system 10 in the present exemplary embodiment, the image light L0 (zero-order light LD0) that has reached the rear surface 52 of the first diffraction element 50 is absorbed by the light shielding member 49 provided on the rear surface 52 of the first diffraction element 50. As a result, surface reflection of the zero-order light LD0 due to the rear surface 52 can be reduced. That is, as illustrated in FIG. 11, a portion of the image light L0 is reflected on the front surface (rear surface 52) of the first diffraction element 50 to reduce the image light L0 being incident on the eye of the observer as the zero-order light LD0.

Therefore, according to the optical system 10 in the present exemplary embodiment, providing the light shielding member 49 on the back surface 52 of the first diffraction element 50 makes it possible to reduce the amount of zero-order light LD0 incident on the eye E of the observer. Thus, a high-quality image with little ghost can be visible to the observer.

Figure 14:
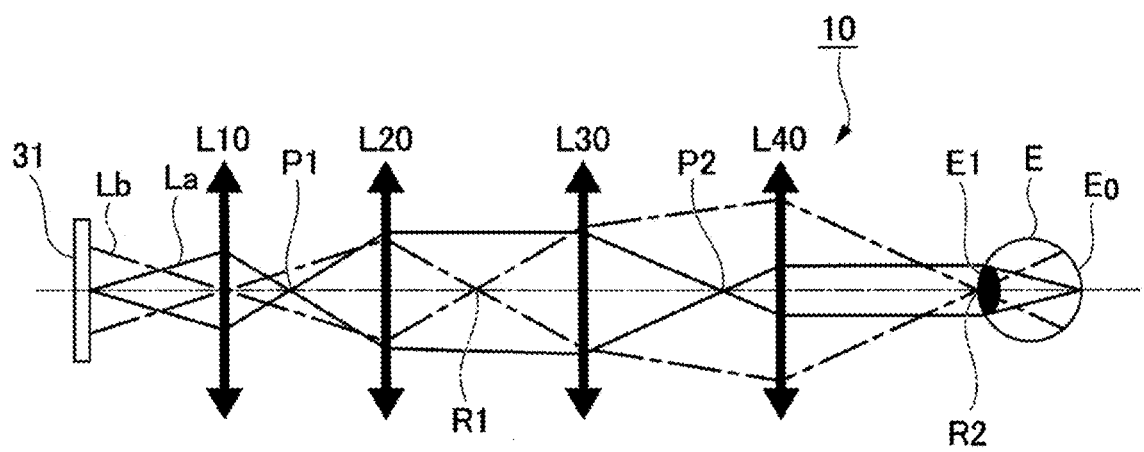
FIG. 14 is a diagram schematically illustrating a ray diagram of an optical system.

FIG. 14 is a diagram schematically illustrating a ray diagram of the optical system 10 in the present exemplary embodiment. In FIG. 14, each optical unit disposed along the optical axis is indicated by a thick arrow. Further, in FIG. 14, a light beam of the image light emitted from the center of the image light generating device 31 is indicated by the solid line La and a primary light beam of the image light emitted from an end portion of the image light generating device 31 is indicated by the dot-and-dash line Lb. FIG. 14 also illustrates travel of light emitted from the image light generating device 31. Note that, in FIG. 14, all optical units are illustrated as the transmissive-type for simplification of the figure. In the following description, an "intermediate image" is a location where the light beam (solid line La) emitted from one pixel converges, and a "pupil" is a location where the main light beam (dot-and-dash line Lb) at each angle of view converges.

As illustrated in FIG. 14, the optical system 10 in the present exemplary embodiment includes the first optical unit L10 having positive power, the second optical unit L20 having positive power and including the first diffraction element 50, the third optical unit L30 having positive power, and the fourth optical unit L40 having positive power and including the second diffraction element 70. These units are disposed along an optical path of the image light emitted from the image light generating device 31.

In the optical system 10 in the present exemplary embodiment, a first intermediate image P1 of the image light is formed between the first optical unit L10 and the third optical unit L30, a pupil R1 is formed between the second optical unit L20 and the fourth optical unit L40, a second intermediate image P2 of the image light is formed between the third optical unit L30 and the fourth optical unit L40, and the fourth optical unit L40 collimates the image light to form an exit pupil R2. At this time, the third optical unit L30 causes the main light beam at the angle of view of the image light emitted from the second optical unit L20 to be incident on the fourth optical unit L40 as divergent light.

In the optical system 10 in the present exemplary embodiment, the pupil R1 is formed between the second optical unit L20 and the third optical unit L30 between the second optical unit L2 and the fourth optical unit L40.

Thus, according to the optical system 10 of the present exemplary embodiment, the first intermediate image P1 of the image light is formed between the projection optical system 32 and the light guiding system 60, the pupil R1 is formed in the vicinity of the light guiding system 60, the second intermediate image P2 of the image light is formed between the light guiding system 60 and the second diffraction element 70, and the second diffraction element 70 collimates the image light to form the exit pupil R2.

In the optical system 10 in the present exemplary embodiment, the first intermediate image P1 is formed between the first optical unit L10 (projection optical system 32) and the second optical unit L20 (first diffraction element 50).

According to the optical system 10 in the present exemplary embodiment, three conditions (Conditions 1, 2, and 3) described below are satisfied.

Condition 1: the light rays emitted from one point of the image light generating device 31 are formed into one point on the retina E0.

Condition 2: An incident pupil of the optical system and a pupil of an eye are conjugated.

Condition 3: A peripheral wavelength is compensated between the first diffraction element 50 and the second diffraction element 70.

More specifically, as seen from the dot-and-dash line Lb in FIG. 14, Condition 3 that the light rays emitted from one point of the image light generating device 31 are formed into one point on the retina E0 is satisfied, and thus the observer can visually recognize one pixel. Further, as seen from the solid line La in FIG. 14, Condition 2 that the incident pupil of the optical system 10 and the pupil E1 of the eye E are conjugated (conjugation of the pupil) is satisfied, and thus the entire region of the image generated by the image light generating device 31 can be visually recognized. Further, as described above, Condition 3 that the peripheral wavelength of the image light L0 is compensated between the first diffraction element 50 and the second diffraction element 70 is satisfied by providing the correction optical system 45, and thus a color aberration generated by the second diffraction element 70 can be canceled. In addition, by providing the light shielding member 49 as described above, the zero-order light LD0 incident on the eye E of the observer is reduced, and a high-quality image with little ghost can be visible to the observer.

Second Exemplary Embodiment

Next, a display device according to a second exemplary embodiment will be described. The present exemplary embodiment differs from the first exemplary embodiment in terms of the configuration of the optical system. Specifically, the configuration of the second optical unit differs between the present exemplary embodiment and the first exemplary embodiment. The configuration of the second optical unit will be primarily described below. Note that members common to the first exemplary embodiment will be referred to by identical reference symbols and a detailed description thereof will be omitted.

Figure 15:
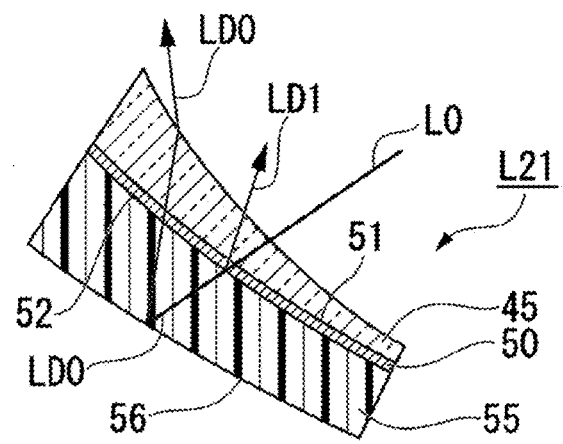
FIG. 15 is a cross-sectional view illustrating the configuration of a main portion of a second optical unit according to a second exemplary embodiment.

FIG. 15 is a cross-sectional view illustrating the configuration of a main portion of the second optical unit according to the present exemplary embodiment. As illustrated in FIG. 15, a second optical unit L21 includes the first diffraction element 50, the correction optical system 45 and a light-transmitting member 55. The light-transmitting member 55 corresponds to a second light-transmitting member.

The light-transmitting member 55 is provided on the rear surface (second surface) 52 of the first diffraction element 50. The light-transmitting member 55 is formed of a material such as plastic or glass having a refractive index of 1.3 to 1.6 close to that of the hologram element constituting the first diffraction element 50. The light-transmitting member 55 has a rear surface (third surface) 56 opposite to the first diffraction element 50. The rear surface 56 has a shape different to that of the rear surface 52 of the first diffraction element 50. That is, the direction of travel of the light reflected by the rear surface 56 of the light-transmitting member 55 is different to the direction of travel of the light reflected by the rear surface 52 of the first diffraction element 50. Specifically, the rear surface 56 is formed of a flat surface, a spherical surface or an aspherical surface so as to have a shape that can reflect the image light L0 toward an optical path that does not cause the image light L0 to be incident on the eye of the observer.

Note that the rear surface 56 may have the same shape as the rear surface 52 of the first diffraction element 50. In this case, the wall thickness of the light-transmitting member 55 can be partially increased to create a state where the wall thickness of the light-transmitting member 55 is not constant. As a result, the direction of travel of the light reflected by the rear surface 56 of the light-transmitting member 55 and the direction of travel of the light reflected by the rear surface 52 of the first diffraction element 50 are made to be different from each other.

Alternatively, the wall thickness of the light-transmitting member 55 may be constant. In this case, the wall thickness of the light-transmitting member 55 may be increased to cause the light reflected by the rear surface 56 of the light-transmitting member 55 and the light reflected by the rear surface 52 of the first diffraction element 50 to be incident on the correction optical system 45 at different positions.

Here, as a comparative example, a case in which the light-transmitting member 55 is not provided is considered. In this case, a portion of the image light L0 is reflected by the rear surface 52 of the first diffraction element 50, and thus is incident on the eye of the observer as the zero-order light LD0 and visible as a ghost.

In contrast, the second optical unit L21 in the present exemplary embodiment includes the light-transmitting member 55 provided on the rear surface 52 of the first diffraction element 50. According to the second optical unit L21 in the present exemplary embodiment, as illustrated in FIG. 15, the image light L0 incident on the rear surface 52 of the first diffraction element 50 is incident on the light-transmitting member 55. Because the light-transmitting member 55 has a refractive index close to that of the first diffraction element 50 as described above, the image light L0 is not reflected at the interface between the first diffraction element 50 and the light-transmitting member 55 and is efficiently incident on the light-transmitting member 55.

The image light L0 incident on the light-transmitting member 55 is surface-reflected by the rear surface 56 of the light-transmitting member 55. The image light L0 is reflected by the rear surface 56 of the light-transmitting member 55 so as to travel on an optical path that is not incident on the eye of the observer. Therefore, according to the optical system in the present exemplary embodiment, light of a component that is incident on the eye of the observer as the zero-order light LD0 due to being reflected by the surface (rear surface 52) of the first diffraction element 50 when the light-transmitting member 55 is not provided can be reflected by the rear surface 56 of the light-transmitting member 55 so as not to be incident on the eye of the observer. Thus, even in an optical system including the second optical unit L21 according to the present exemplary embodiment, the observer can be made to view a high-quality image with little ghost by reducing the zero-order light LD0 incident on the eye E of the observer.

Third Exemplary Embodiment

Next, a display device according to a third exemplary embodiment will be described. The present exemplary embodiment differs from the first exemplary embodiment in terms of the configuration of the optical system. Specifically, the present exemplary embodiment only differs from the optical system in the first exemplary embodiment in terms of the configuration of the correction optical system. The configuration of the correction optical system will primarily be described below. Note that members common to the first exemplary embodiment will be denoted by identical reference symbols and a detail description thereof will be omitted.

Figure 16:
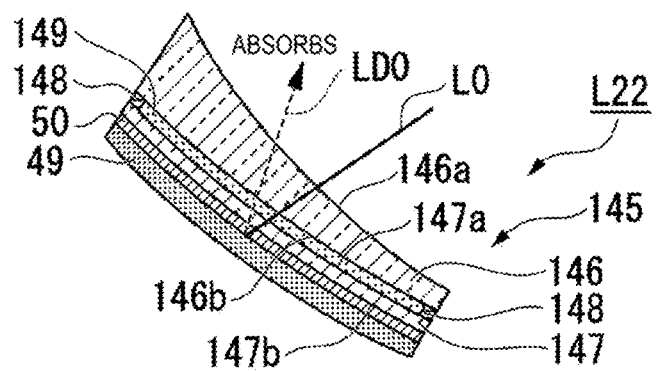
FIG. 16 is a cross-sectional view illustrating the configuration of a main portion of a second optical unit according to a third exemplary embodiment.

FIG. 16 is a cross-sectional view illustrating the configuration of a main portion of the second optical unit according to the present exemplary embodiment. As illustrated in FIG. 16, a second optical unit L22 includes the first diffraction element 50, a correction optical system 145 and the light shielding member 49.

The correction optical system 145 in the present exemplary embodiment is constituted by a combination of a plurality of optical members. The correction optical system 145 includes a first member 146, a second member 147, a spacer member 148, and a bonding material 149 and has the same function as a prism with a power capable of deflecting the image light L0 as a whole. The first member 146 and the second member 147 are formed of a translucent optical member such as plastic, glass, or film. In the present embodiment, the second member 147 is made of, for example, a film. In other words, the first member 146 and the second member 147 correspond to a plurality of optical members.

A front surface 146a of the first member 146 functions as a light incident/exit face in the second optical unit L22. The surface 146a is a surface having positive optical power.

The first diffraction element 50 is provided on a rear surface 147b of the second member 147. The first member 146 is provided on the second member 147 closer to a front surface 147a via the spacer member 148. The spacer member 148 holds the first member 146 and the second member 147 at a predetermined interval. In other words, the spacer member 148 functions as a positioning member that defines the positions of the first member 146 and the second member 147. As a result, the front surface 146a of the first member 146 and the first diffraction element 50 provided on the rear surface 147b of the second member 147 can be precisely aligned.

Note that the spacer member 148 may be formed integrally with the rear surface 146b of the first member 146 or the front surface 147a of the second member 147. The number of parts can be reduced by integrally forming the spacer member 148 with the first member 146 or the second member 147.

The bonding material 149 is provided in the gap between the first member 146 and the second member 147 to join the first member 146 and the second member 147 together. The bonding material 149 is made of a transparent adhesive. More specifically, the bonding material 149 is made of an adhesive having a refractive index equal to the refractive index of the first member 146 and the second member 147. With such a bonding material 149, the difference in refractive index occurring at the interface between the bonding material 149 and the first member 146 or the second member 147 is reduced. Thus, the image light L0 passes through the correction optical system 145 without being reflected at the interface between the bonding material 149 and the first member 146 or the second member 147.

The second optical unit L22 in the present exemplary embodiment is configured by joining the first member 146 disposed via the spacer member 148 to the second member 147 that forms the first diffraction element 50 using the joining member 149.

According to the optical system including the second optical unit L22 in the present exemplary embodiment, similar to the optical system 10 according to the first exemplary embodiment, the light shielding member 49 can reduce the amount of zero-order light LD0 incident on the eye E of the observer such that the observer can view a high-quality image.

Fourth Exemplary Embodiment

Next, a display device according to a fourth exemplary embodiment will be described. The present exemplary embodiment differs from the third exemplary embodiment in terms of the configuration of the optical system. The configuration of the correction optical system will primarily be described below. Note that members common to the third exemplary embodiment will be denoted by identical reference symbols and a detail description thereof will be omitted.

Figure 17:
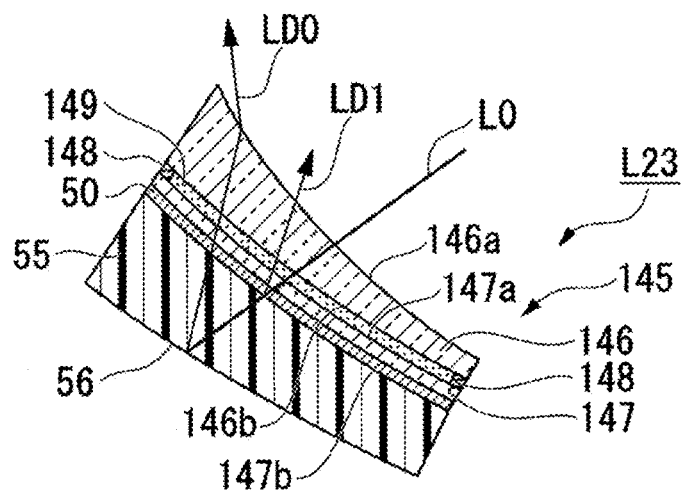
FIG. 17 is a cross-sectional view illustrating the configuration of a main portion of a second optical unit according to a fourth exemplary embodiment.

FIG. 17 is a cross-sectional view illustrating the configuration of a main portion of the second optical unit according to the present exemplary embodiment. As illustrated in FIG. 17, a second optical unit L23 includes the first diffraction element 50, the correction optical system 145 and the light-transmitting member 55. In other words, the second optical unit L20 in the present exemplary embodiment differs from other exemplary embodiments in that the light shielding member 49 of the third exemplary embodiment has been replaced with the light-transmitting member 55. The light-transmitting member 55 is provided on the rear surface 52 of the first diffraction element 50.

According to the optical system including the second optical unit L23 of the present exemplary embodiment, the light of a component incident on the eye of the observer as the zero-order light LD0 is reflected by the rear surface 56 of the light-transmitting member 55 to allow the observer to view a high-quality image.

Fifth Exemplary Embodiment

Next, a display device according to a fifth exemplary embodiment will be described. A case in which the correction optical system corrects the image light such that the light with the specific wavelength, the light on the short wavelength side and the light on the long wavelength side are incident at one point on the second diffraction element 70 in the optical system in the above-described exemplary embodiment has been described above. In the present exemplary embodiment, a case in which the positions at which the light with a specific wavelength, the light on the short wavelength side and the light on the long wavelength side are incident on the second diffraction element 70 slightly differ from each other is described.

Figure 18:
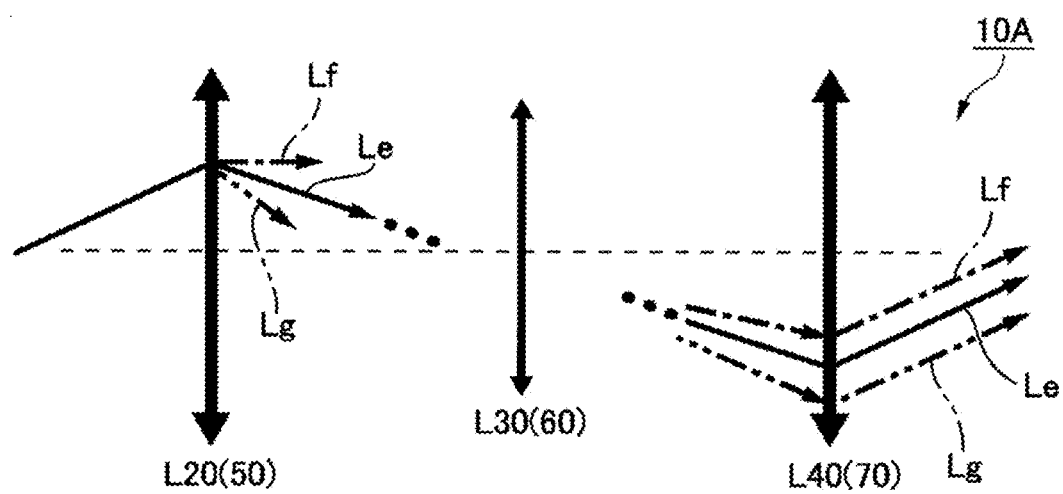
FIG. 18 is a ray diagram illustrating rays between a first diffraction element and a second diffraction element in an optical system according to a fifth exemplary embodiment.
Figure 19:
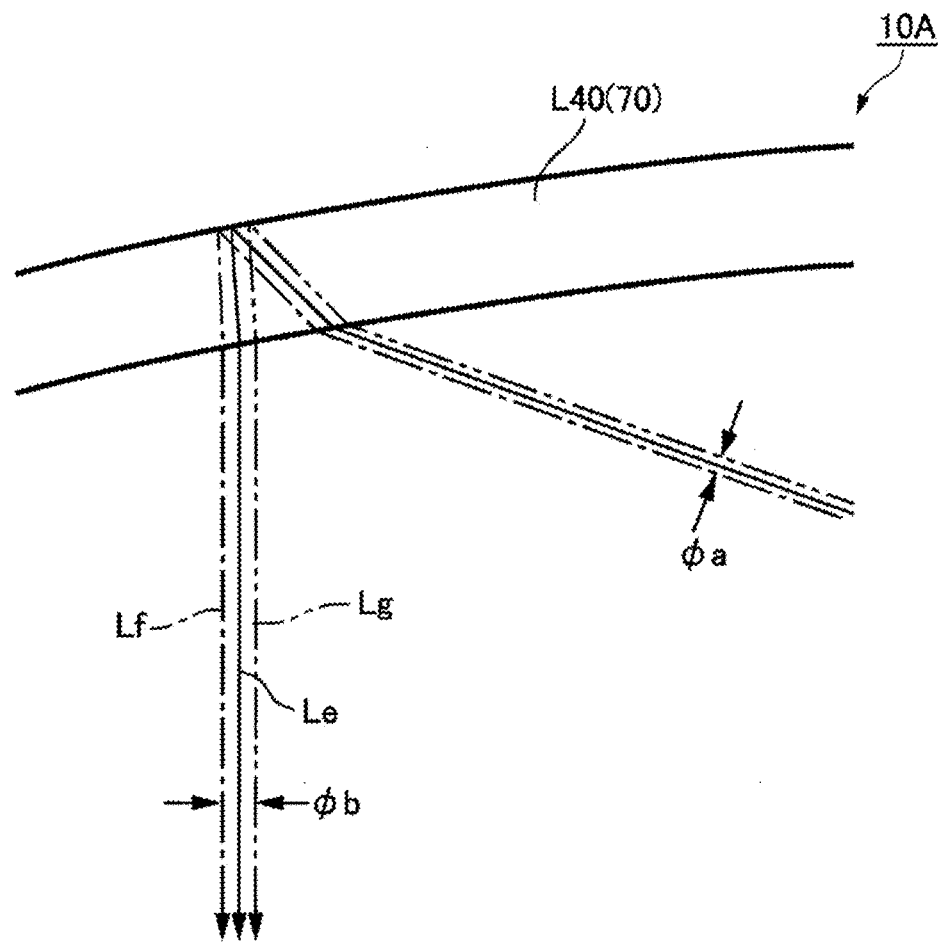
FIG. 19 is an explanatory view of light emitted from the second diffraction element.
Figure 20:
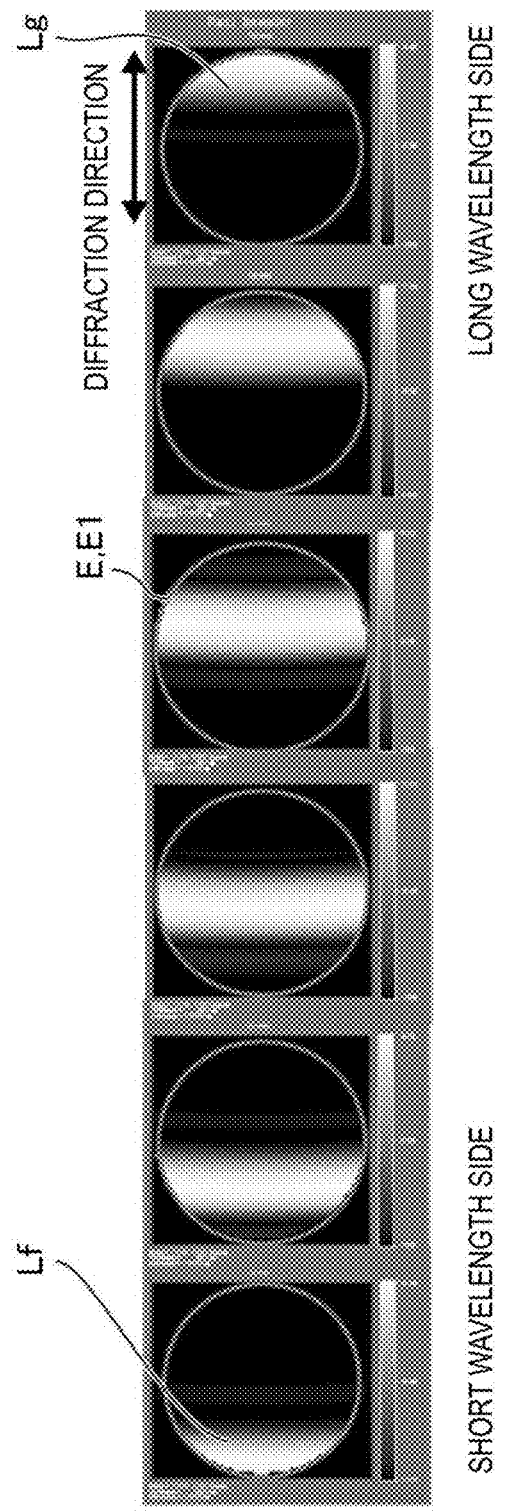
FIG. 20 is an explanatory view illustrating a state in which the light illustrated in FIG. 19 is incident on an eye.

FIG. 18 is a ray diagram illustrating rays between the first diffraction element 50 and the second diffraction element 70 in an optical system 10A according to the present exemplary embodiment. FIG. 19 is an explanatory view of light emitted from the second diffraction element 70. FIG. 20 is an explanatory view illustrating a state in which the light illustrated in FIG. 19 is incident on the eye E. Note that, in FIG. 18, light of the specific wavelength is indicated by the solid line Le, light of a wavelength equivalent to the specific wavelength −10 nm is indicated by the dot-dash line Lf, and light of a wavelength equivalent to the specific wavelength +10 nm is indicated by the two-dot chain line Lg. FIG. 20 shows light having a wavelength of the specific wavelength −10 nm (light indicated by dot-dash line Lf in FIG. 19) incident on the eye E on the far left, light having a wavelength of the specific wavelength +10 nm (light indicated by the two-dot chain line Lg in FIG. 19) incident on the eye E on the far right, and light having wavelengths varied from the specific wavelength −10 nm to the specific wavelength +10 nm incident on the eye E in the middle. Note that, while light of the specific wavelength incident on the eye E is not shown in FIG. 20, light of the specific wavelength incident on the eye E is an intermediate state between the state shown third from the left and the state shown fourth from the left.

As illustrated in FIG. 19, the light with a peripheral wavelength that has deviated from the specific wavelength varies in terms of the state in which the light is incident on the second diffraction element 70. Here, in the second diffraction element 70, as closer to an optical axis, the number of interference patterns is further reduced, and power of bending light is lower. Therefore, when light in a long wavelength side is caused to enter a side close to an optical axis and light in a short wavelength side is caused to enter a side close to an end, light in a specific wavelength and light in a peripheral wavelength are collimated. Consequently, an effect similar to wavelength compensation can be achieved.

In this case, the light beam position deviates by a wavelength as illustrated in FIG. 19. Thus, the diameter of the light beam incident on the pupil increases from a diameter pa to a diameter pb. FIG. 20 shows the states of light beam intensity incident on the pupil at that time. As is understood from FIG. 20, while the pupil cannot be filled in the vicinity of the specific wavelength, light of peripheral wavelengths is incident on a position deviated from the light of the specific wavelength, making it possible to fill the pupil diameter. As a result, an observer has an advantage in that the observer can more easily see an image, for example.

Even in the optical system 10A of the present exemplary embodiment, a high-quality image with little ghost can be visible to the observer by reducing the zero-order light LD0 incident on the eye E of the observer.

Hereinbefore, the exemplary embodiment according to the display device of the present disclosure is described, but the present disclosure is not limited to the above exemplary embodiment, and is appropriately changeable without departing from the gist of the disclosure.

For example, in the exemplary embodiments described above, an example is given of the case in which the second diffraction angle of the image light L0 at the second diffraction element 70 is greater than the first diffraction angle of the image light L0 at the first diffraction element 50. However, the present disclosure is not limited to this example. In other words, in the present disclosure, it is sufficient that the second diffraction angle of the second diffraction element 70 and the first diffraction angle of the first diffraction element 50 are different from each other, and the first diffraction angle may be greater than the second diffraction angle. In this way, even when the first diffraction angle is greater than the second diffraction angle, by providing the correction optical system, the size reduction of the display device can be achieved while appropriately performing wavelength compensation by the two diffraction elements.

An exemplary case in which the correction optical system 45 in the exemplary embodiments described above has all the functions illustrated in FIGS. 10A to 10C has been described. However, the correction optical system of the present disclosure need only have at least one of these functions.

Modification Example

Figure 21:
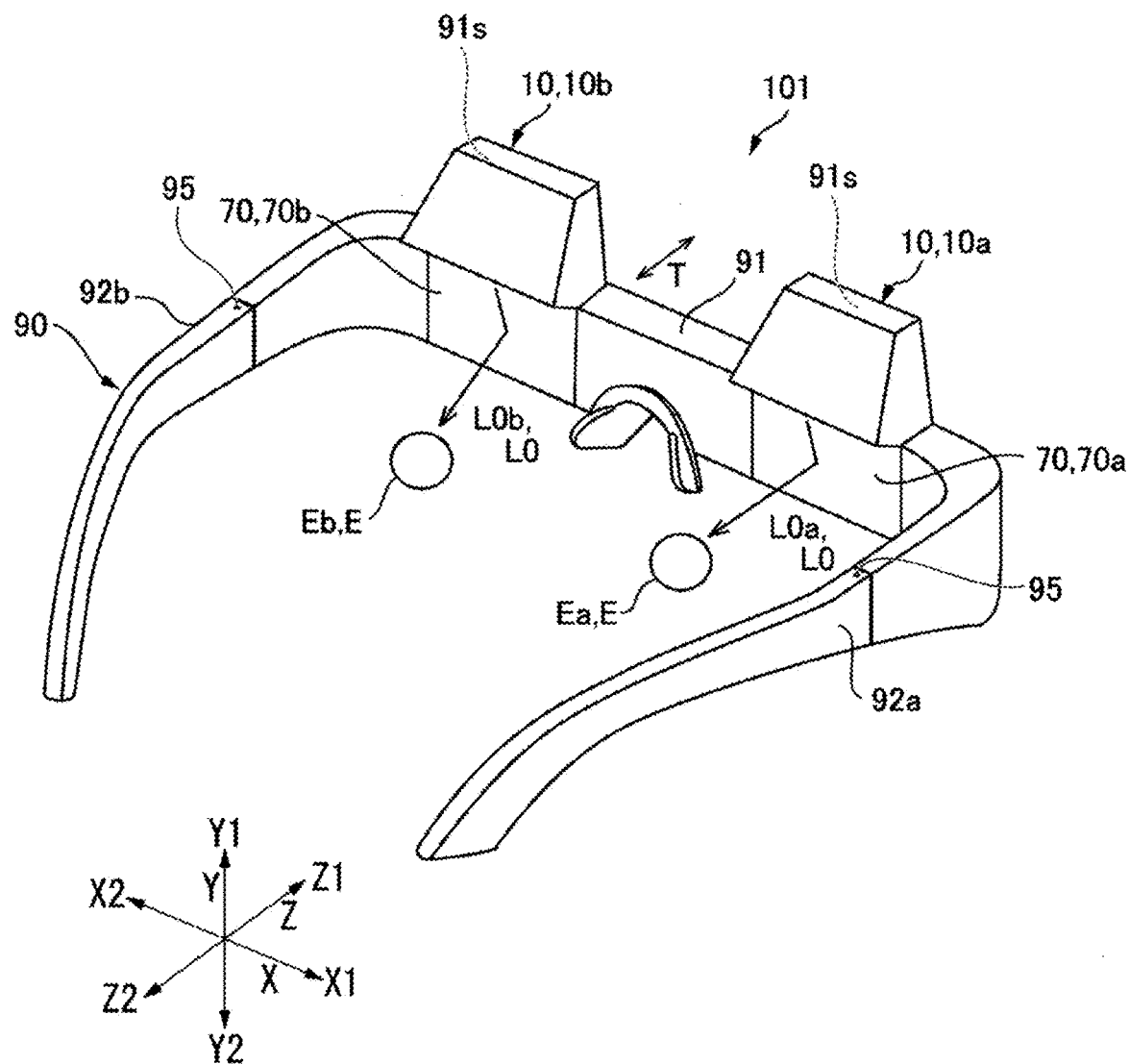
FIG. 21 is a configuration diagram of a display device according to a modification example.

FIG. 21 is a configuration diagram of a display device 101 according to a modification example. As illustrated in FIG. 21, the display device 101 according to the modification example includes a right-eye optical system 10a that causes image light L0a to be incident on a right eye Ea, a left-eye optical system 10b that causes image light L0b to be incident on a left eye Eb, and a housing 90 that holds the right-eye optical system 10a and the left-eye optical system 10b.

The display device 101 in the present modification example has a configuration in which the image light L0 travels from the upper side Y1 to the lower side Y2 in the right-eye optical system 10a and the left-eye optical system 10b, and is thus emitted to an eye E of an observer.

The display device 101 in the present modification example also includes the above-described optical system 10. Thus, the display device 101 in the present modification example can also achieve the side reduction of the device while appropriately performing wavelength compensation by two diffraction elements.

Application to Other Display Apparatus

In the exemplary embodiments described above, the head-mounted display device 100 is exemplified, but the present disclosure may be applied to a head-up display, a handheld display, a projector optical system, and the like.

What is claimed is:

1. A display device comprising, along an optical path of image light emitted from an image light generating device:
   a first optical unit having positive power;
   a second optical unit having positive power and including a first diffraction element of a reflective type, the first diffraction element having an element body, a first surface and a second surface, the first surface and the second surface opposing each other and sandwiching the element body in a thickness direction of the first diffraction element;
   a third optical unit having positive power; and
   a fourth optical unit having positive power and including a second diffraction element of a reflective type, wherein
   the second optical unit includes a first light-transmitting member having optical power and provided on the first surface of the first diffraction element, and a light shielding member provided on the second surface of the first diffraction element, the first light-transmitting member and the light shielding member sandwiching the first diffraction element in the thickness direction.

2. The display device according to claim 1, wherein the first light-transmitting member includes a plurality of optical members.

3. The display device according to claim 2, wherein
   the first light-transmitting member further includes a bonding material for bonding the plurality of optical members together, and
   the bonding material has a refractive index equal to a refractive index of the plurality of optical members.

4. The display device according to claim 1, wherein a first diffraction angle of the image light at the first diffraction element differs from a second diffraction angle of the image light at the second diffraction element.

5. The display device according to claim 4, wherein the second diffraction angle is greater than the first diffraction angle.

6. The display device according to claim 1, wherein the first light-transmitting member includes a prism.

7. A display device comprising, along an optical path of image light emitted from an image light generating device:
   the image light generating device;
   a first optical unit having positive power;
   a second optical unit having positive power and including a first diffraction element of a reflective type, the first diffraction element having an element body, a first surface and a second surface, the first surface and the second surface opposing each other and sandwiching the element body in a thickness direction of the first diffraction element;
   a third optical unit having positive power; and
   a fourth optical unit having positive power and including a second diffraction element of a reflective type, wherein
   the second optical unit includes a first light-transmitting member having optical power and provided on the first surface of the first diffraction element, and a second light-transmitting member provided on the second surface of the first diffraction element, the first light-transmitting member and the second light-transmitting member sandwiching the first diffraction element in the thickness direction.

8. The display device according to claim 7, wherein a third surface of the second light-transmitting member, on an opposite side from the first diffraction element, has a shape different from that of the second surface of the first diffraction element.

9. The display device according to claim 7, wherein a third surface of the second light-transmitting member, on an opposite side from the first diffraction element, has the same shape as that of the second surface of the first diffraction element.

* * * * *